(12) United States Patent
Imai

(10) Patent No.: US 11,713,231 B2
(45) Date of Patent: Aug. 1, 2023

(54) LIQUID SUPPLY DEVICE AND LIQUID SUPPLY METHOD

(71) Applicant: Surpass Industry Co., Ltd., Gyoda (JP)

(72) Inventor: Hiroshi Imai, Gyoda (JP)

(73) Assignee: Surpass Industry Co., Ltd., Gyoda (JP)

( * ) Notice: Subject to any disclaimer, the term of this patent is extended or adjusted under 35 U.S.C. 154(b) by 0 days.

(21) Appl. No.: 17/752,460

(22) Filed: May 24, 2022

(65) Prior Publication Data

US 2022/0380190 A1 Dec. 1, 2022

(30) Foreign Application Priority Data

May 26, 2021 (JP) .................................. 2021-088515

(51) Int. Cl.
*B67C 3/34* (2006.01)
*B67D 7/02* (2010.01)
*B25J 9/16* (2006.01)
*B25J 13/08* (2006.01)
*F16J 13/02* (2006.01)
*F16J 13/24* (2006.01)

(52) U.S. Cl.
CPC ............... *B67C 3/34* (2013.01); *B25J 9/1612* (2013.01); *B25J 9/1664* (2013.01); *B25J 13/08* (2013.01); *B67D 7/0288* (2013.01); *F16J 13/02* (2013.01); *F16J 13/24* (2013.01)

(58) Field of Classification Search
CPC ........ B67C 3/34; B67D 7/0288; B25J 9/1612; B25J 9/1664; B25J 13/08; F16J 13/02; F16J 13/24
See application file for complete search history.

(56) References Cited

U.S. PATENT DOCUMENTS

| | | | | |
|---|---|---|---|---|
| 6,053,219 A | * | 4/2000 | Seiver | G01G 17/06 141/83 |
| 6,543,494 B2 | * | 4/2003 | Bellin | B67C 3/30 141/192 |
| 6,725,890 B1 | * | 4/2004 | Green | B65B 3/28 141/168 |
| 6,863,092 B2 | * | 3/2005 | Seiver | B67C 3/30 141/2 |
| 8,210,204 B2 | * | 7/2012 | Hasunuma | F16L 37/35 137/553 |

(Continued)

FOREIGN PATENT DOCUMENTS

JP 2018-020793 A 2/2018

*Primary Examiner* — Nicolas A Arnett
(74) *Attorney, Agent, or Firm* — Muncy, Geissler, Olds & Lowe, P.C.

(57) ABSTRACT

Provided is a liquid supply device including: a plug having a plug side liquid channel; a socket having a socket side liquid channel; a hand configured to grip the socket and arrange the socket in a predetermined attitude at a three-dimensional position within the motion range; and an image capturing unit configured to recognize the orientation of the plug axis of the plug. The hand grips the socket so that the socket and the plug are in an attitude where the orientation of a socket axis matches the orientation of the plug axis recognized by the image capturing unit, and the socket gripped by the hand is inserted in the plug to couple the socket side liquid channel to the plug side liquid channel.

8 Claims, 15 Drawing Sheets

(56) References Cited

U.S. PATENT DOCUMENTS

| | | | |
|---|---|---|---|
| 8,342,209 B2* | 1/2013 | Hasunuma | F16L 37/36 |
| | | | 138/90 |
| 9,868,215 B2* | 1/2018 | Suzuki | B25J 9/1612 |
| 10,807,744 B1* | 10/2020 | Seiver | B67B 3/204 |
| 11,047,515 B2* | 6/2021 | Imai | F16L 37/32 |
| 11,559,900 B2* | 1/2023 | Correll | B25J 15/10 |
| 11,565,422 B2* | 1/2023 | Ooba | B25J 9/0093 |
| 2003/0196723 A1* | 10/2003 | Ozawa | B67D 7/0288 |
| | | | 141/326 |
| 2008/0247844 A1* | 10/2008 | Hartrampf | B21J 15/32 |
| | | | 901/30 |
| 2009/0302597 A1* | 12/2009 | Takanohashi | B67D 7/3209 |
| | | | 285/29 |
| 2019/0299350 A1* | 10/2019 | Sakai | B25J 9/1633 |
| 2021/0283771 A1* | 9/2021 | Ijiri | B25J 13/088 |
| 2022/0002132 A1* | 1/2022 | Ray | B67D 1/0805 |
| 2022/0380190 A1* | 12/2022 | Imai | B67C 3/34 |
| 2023/0030810 A1* | 2/2023 | Imai | B67C 3/34 |

* cited by examiner

LIQUID SUPPLY DEVICE AND LIQUID SUPPLY METHOD

CROSS-REFERENCE TO RELATED APPLICATIONS

This application is based on Japanese Patent Application No. 2021-088515 filed on May 26, 2021, the contents of which are incorporated herein by reference in its entirety.

BACKGROUND

1. Technical Field

The present disclosure relates to a liquid supply device and a liquid supply method.

2. Description of Related Art

Conventionally, a liquid supply device that supplies a liquid contained in a liquid storage container to a plurality of supply target devices is known (for example, see Japanese Patent Application Laid-Open No. 2018-20793).

The liquid supply device disclosed in Japanese Patent Application Laid-Open No. 2018-20793 couples a liquid channel formed in a plug and a liquid channel formed in a socket to each other by fixing the plug to an opening of a liquid storage container and attaching the socket to the plug. When attaching the socket to the plug, a worker engages an external thread formed in an attaching nut of the socket with an internal thread part formed in the plug.

The liquid supply device disclosed in Japanese Patent Application Laid-Open No. 2018-20793 requires a worker to perform work to grip the socket and attach the socket to the plug when coupling the liquid channel formed in the plug and the liquid channel formed in the socket to each other. This may increase a work burden on the worker, and the worker may be exposed to a hazard when handling a hazardous liquid.

Accordingly, to prevent an increase in the work burden on the worker or exposure of the worker to a hazard, it is conceivable to use a robot hand configured to grip a socket and automate the work of attaching the socket to a plug. For example, it is conceivable to store in advance the position of the plug disclosed in Japanese Patent Application Laid-Open No. 2018-20793 and move the socket to the stored position by using the robot hand.

However, since the position or the orientation of the openings differs among liquid storage containers for each individual, the position or the orientation of the plugs installed in the openings can also differ among the liquid storage containers for each individual. Further, when there is a change in the internal pressure of a liquid storage container due to the state of a liquid contained in the liquid storage container, the environmental temperature, or the like, this will cause a change in the orientation of the opening to which the plug is fixed, accordingly.

In such a case, for some position or orientation of the plug, the socket may be unable to be attached even when the socket is accurately moved to a predefined position in a three-dimensional space. Further, if the socket and the plug are forcedly connected to each other with unmatched orientations thereof, a stress is applied to the socket and the plug, and accumulation of such a stress may lead to a failure.

BRIEF SUMMARY

The present disclosure has been made in view of such circumstances and intends to provide a liquid supply device and a liquid supply method that can reliably couple a socket side liquid channel to a plug side liquid channel regardless of the orientation of a plug fixed to an opening of a liquid storage container.

To solve the problem described above, the present disclosure employs the following solutions.

A liquid supply device according to one aspect of the present disclosure includes: a first plug fixed to a first opening in an upper face of a liquid storage container and having a plug side liquid channel extending along a first plug axis; a first socket detachably attached to the first plug and having a socket side liquid channel extending along a first socket axis; a gripping mechanism configured to grip the first socket and arrange the first socket in a predetermined attitude at a three-dimensional position within a motion range; and a recognition unit configured to recognize the orientation of the first plug axis of the first plug, wherein the gripping mechanism grips the first socket so that the first socket and the first plug are in an attitude where the orientation of the first socket axis matches the orientation of the first plug axis recognized by the recognition unit, and wherein when the first socket gripped by the gripping mechanism is inserted in the first plug, the socket side liquid channel is coupled to the plug side liquid channel.

According to the liquid supply device of one aspect of the present disclosure, the recognition unit recognizes the orientation of the first plug axis of the first plug, and the gripping mechanism grips the first socket so that the first socket and the first plug are in the attitude where the orientation of the first socket axis matches the orientation of the first plug axis. The first socket gripped by the gripping mechanism is inserted in the first plug, and thereby the socket side liquid channel is coupled to the plug side liquid channel. Since the first socket is gripped by the gripping mechanism in a suitable attitude with respect to the orientation of the first plug, it is possible to reliably couple the socket side liquid channel to the plug side liquid channel regardless of the orientation of the first plug fixed to the first opening of the liquid storage container.

The liquid supply device according to one aspect of the present disclosure is preferably configured such that a first groove extending annularly about the first plug axis and having a plug side fixing part is formed in a tip of the first plug, a first protrusion extending annularly about the first socket axis and having a socket side fixing part is formed in a tip of the first socket, the gripping mechanism inserts the first protrusion in the first groove so that the socket side fixing part is arranged at a position distant by a first predetermined distance from the plug side fixing part on the first plug axis recognized by the recognition unit, and the first socket has an adjustment unit configured to adjust the position on the first socket axis of the socket side fixing part with respect to a grip position gripped by the gripping mechanism to form a fixed state where the socket side fixing part is fixed to the plug side fixing part.

According to the liquid supply device of the above configuration, it is possible to form a state where the first protrusion of the first socket is inserted in the first groove of the first plug by the gripping mechanism and thus form a fixed state where the socket side fixing part is fixed to the plug side fixing part by the adjustment unit of the socket.

In the liquid supply device of the above configuration, a preferable aspect is that the adjustment unit adjusts the position on the first socket axis of the socket side fixing part with respect to the grip position and releases the fixed state.

According to the liquid supply device of the present aspect, it is possible to adjust the position of the socket side fixing part by using the adjustment unit used for fixing the socket side fixing part to the plug side fixing part and release the fixed state where the socket side fixing part is fixed to the plug side fixing part.

In the liquid supply device of the above aspect, a preferable form is that the gripping mechanism grips the first socket detached from the first plug and moves the first socket to a washing container in which a washing liquid used for washing the first socket is stored.

According to the liquid supply device of the above form, it is possible to move the first socket detached from the first plug to the washing container and wash the first socket with the washing liquid.

The liquid supply device according to one aspect of the present disclosure preferably includes a first cap part configured to seal the plug side liquid channel and having a first insertion part to be inserted in the first groove; and a rotary mechanism having a holding part for holding the first cap part and configured to rotate the holding part about a first cap axis, wherein a first thread is formed in the first insertion part of the first cap part, wherein a second thread adapted to engage with the first thread is formed in the first groove of the first plug, wherein the gripping mechanism grips the rotary mechanism so that the first cap and the first plug are in an attitude where the orientation of the first cap axis matches the orientation of the first plug axis recognized by the recognition unit, and wherein the rotary mechanism detaches the first cap part from the first plug by rotating the holding part in a predetermined direction with the first cap part being held by the holding part.

According to the liquid supply device of the above configuration, the recognition unit recognizes the orientation of the first plug axis of the first plug, and the gripping mechanism grips the rotary mechanism so that the first cap part and the first plug are in the attitude where the orientation of the first cap axis matches the orientation of the first plug axis. The holding part of the rotary mechanism gripped by the gripping mechanism is rotated in a predetermined direction, and thereby the first cap part held by the holding part is detached from the first plug. Since the rotary mechanism is gripped by the gripping mechanism in a suitable attitude with respect to the orientation of the first plug, it is possible to reliably detach the first cap part from the first plug regardless of the orientation of the plug fixed to the opening of the liquid storage container.

In the liquid supply device of the above configuration, a preferable aspect is that the rotary mechanism attaches the first cap part to the first plug by rotating the holding part in the opposite direction to the predetermined direction with the first cap part being held by the holding part.

According to the liquid supply device of the present aspect, it is possible to attach the first cap part to the first plug by rotating the holding part in the opposite direction to the predetermined direction by using the rotary mechanism used for detaching the first cap part from the first plug.

The liquid supply device according to one aspect of the present disclosure preferably includes a second plug fixed to a second opening in the upper face of the liquid storage container and having a plug side gas channel extending along a second plug axis; and a second socket detachably attached to the second plug and having a socket side gas channel extending along a second socket axis, wherein the recognition unit recognizes the orientation of the second plug axis of the second plug, wherein the gripping mechanism grips the second socket so that the second socket and the second plug are in an attitude where the orientation of the second socket axis matches the orientation of the second plug axis recognized by the recognition unit, and wherein when the second socket gripped by the gripping mechanism is inserted in the second plug, the socket side gas channel is coupled to the plug side gas channel.

According to the liquid supply device of the present configuration, the recognition unit recognizes the orientation of the second plug axis of the second plug, and the gripping mechanism grips the second socket so that the second socket and the second plug are in the attitude where orientation of the second socket axis matches the orientation of the second plug axis. The second socket gripped by the gripping mechanism is inserted in the second plug, and thereby the socket side gas channel is coupled to the plug side gas channel. Since the second socket is gripped by the gripping mechanism in a suitable attitude with respect to the orientation of the second plug, it is possible to reliably couple the socket side gas channel to the plug side gas channel regardless of the orientation of the second plug fixed to the second opening of the liquid storage container.

A liquid supply method for supplying a liquid by a liquid supply device according to one aspect of the present disclosure is configured such that the liquid supply device comprises a first plug fixed to a first opening in an upper face of a liquid storage container and having a plug side liquid channel extending along a first plug axis, a first socket detachably attached to the first plug and having a socket side liquid channel extending along a first socket axis, and a gripping mechanism configured to grip the first socket and arrange the first socket in a predetermined attitude at a three-dimensional position within a motion range, the liquid supply method comprising: a recognition step of recognizing the orientation of the first plug axis of the first plug; a gripping step of gripping the first socket by the gripping mechanism so that the first socket and the first plug are in an attitude where the orientation of the first socket axis matches the orientation of the first plug axis recognized by the recognition step; and a coupling step of coupling the socket side liquid channel to the plug side liquid channel by inserting the first socket gripped by the gripping step in the first plug.

According to the liquid supply method of one aspect of the present disclosure, the orientation of the first plug axis of the first plug is recognized in the recognition step, and the first socket is gripped by the gripping mechanism in the gripping step so that the first socket and the first plug are in the attitude where the orientation of the first socket axis matches the orientation of the first plug axis. The first socket gripped in the gripping step is inserted in the first plug, and thereby the socket side liquid channel is coupled to the plug side liquid channel. Since the first socket is gripped by the gripping mechanism in a suitable attitude with respect to the orientation of the first plug, it is possible to reliably couple the socket side liquid channel to the plug side liquid channel regardless of the orientation of the first plug fixed to the first opening of the liquid storage container.

According to the present disclosure, it is possible to provide a liquid supply device and a liquid supply method that can reliably couple a socket side liquid channel to a plug side liquid channel regardless of the orientation of a plug fixed to an opening of a liquid storage container.

DETAILED DESCRIPTION

First Embodiment

Figure 1:
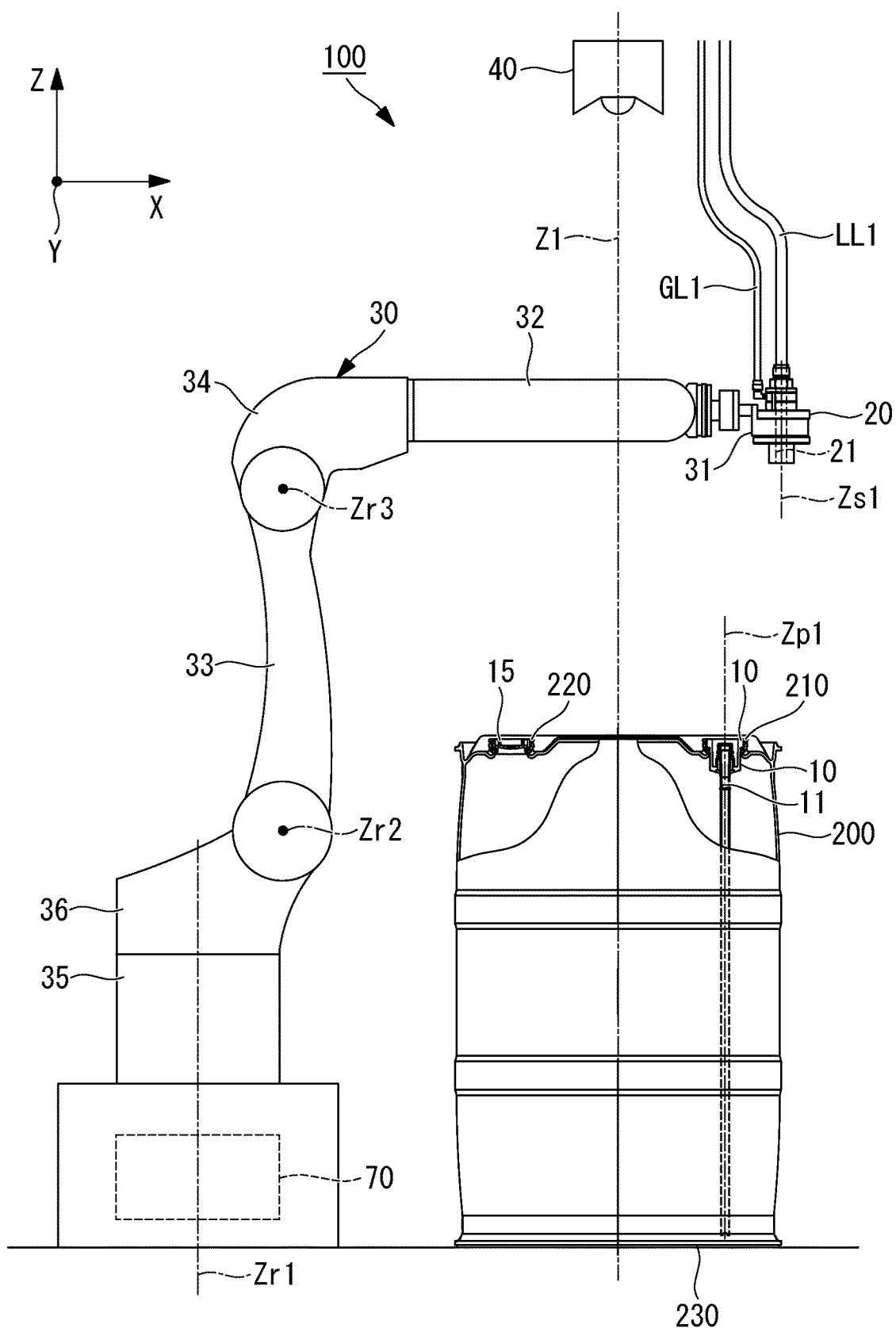
FIG. 1 is a side view illustrating a liquid supply device of a first embodiment of the present disclosure and illustrates a state where a robot grips and carries a socket.
Figure 2:
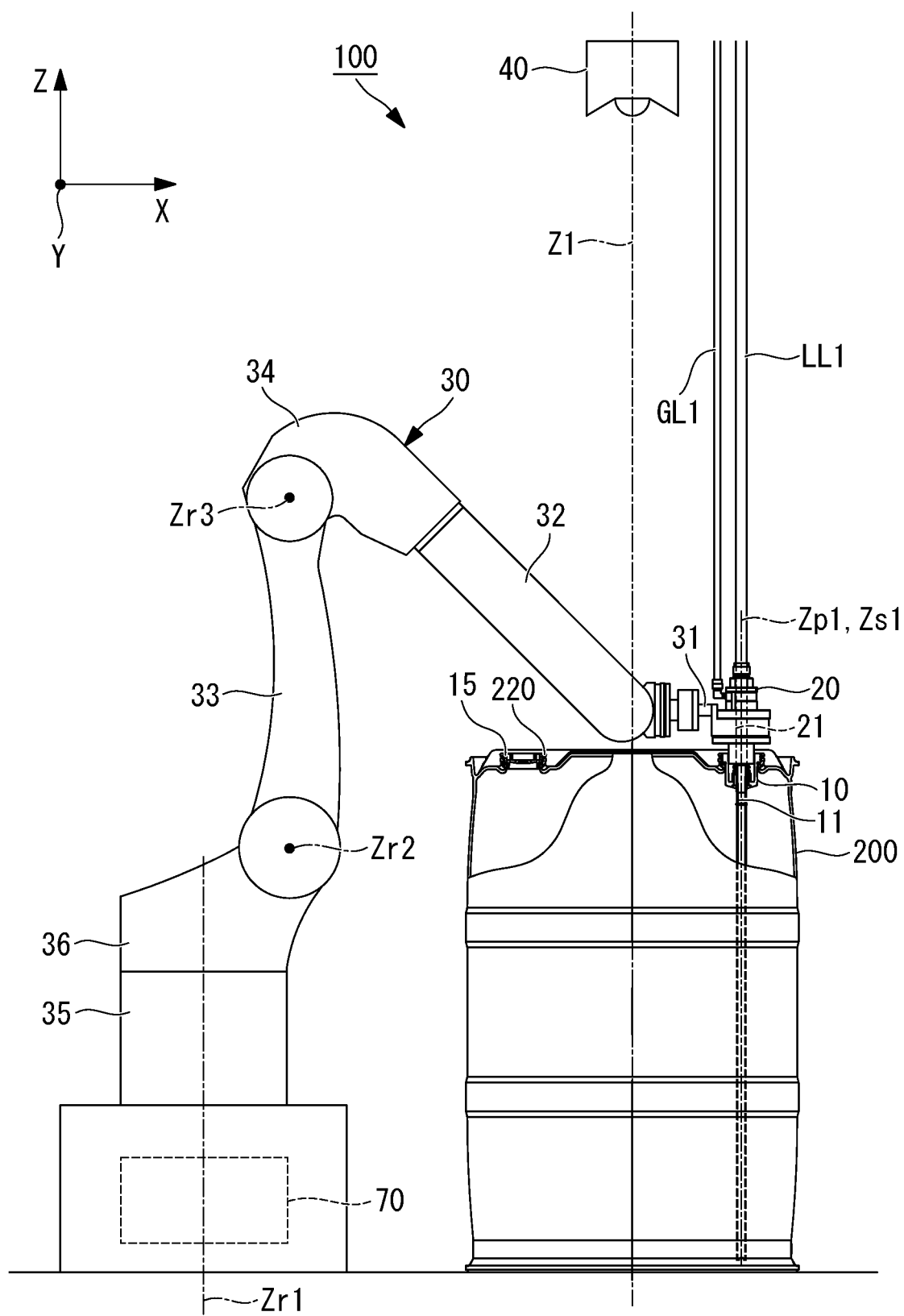
FIG. 2 is a side view illustrating the liquid supply device of the first embodiment of the present disclosure and illustrates a state where the robot has arranged the socket near a plug.
Figure 3:
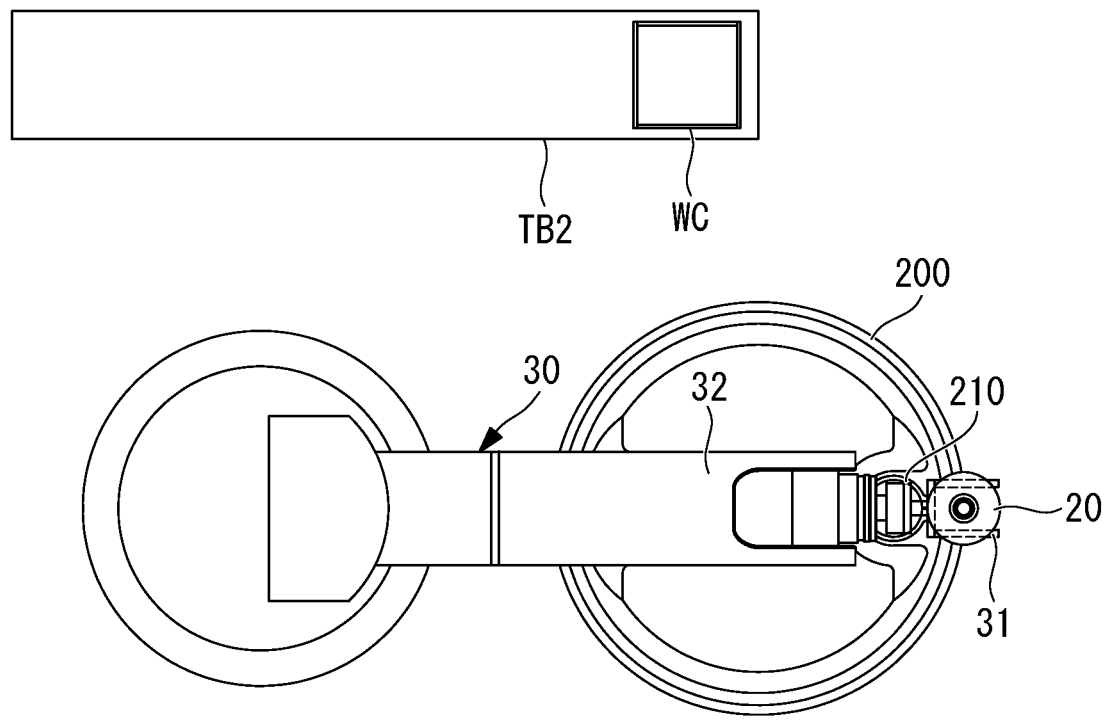
FIG. 3 is a plan view of the liquid supply device illustrated in FIG. 1 when viewed from above and illustrates a state where the robot grips and carries the socket.
Figure 3:
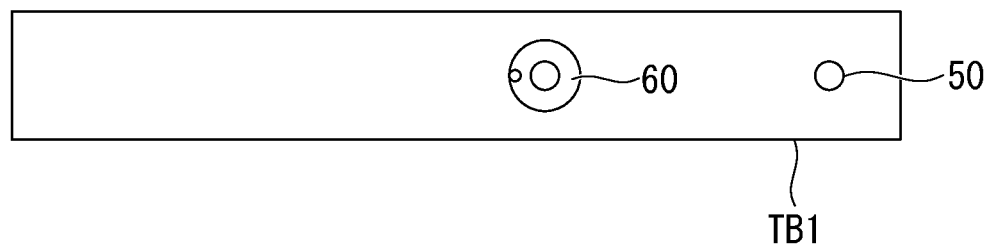
Figure 3:
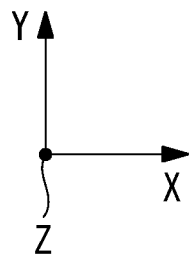

A liquid supply device 100 of a first embodiment of the present disclosure will be described below with reference to the drawings. FIG. 1 and FIG. 2 are side views illustrating the liquid supply device 100 of the present embodiment. FIG. 1 illustrates a state where a robot 30 grips and carries a socket 20. FIG. 2 illustrates a state where the robot 30 has arranged the socket 20 near a plug 10. FIG. 3 is a plan view of the liquid supply device 100 illustrated in FIG. 1 when viewed from above and illustrates a state where the robot 30 grips and carries the socket 20.

The liquid supply device 100 of the present embodiment illustrated in FIG. 1 is a device that supplies a liquid contained in a liquid storage container 200 to a plurality of supply target devices (not illustrated). Herein, the liquid in the present embodiment refers to pure water or various chemical solutions used in a semiconductor manufacturing process performed by a semiconductor manufacturing apparatus, for example.

As illustrated in FIG. 1 to FIG. 3, the liquid supply device 100 has the plug (first plug) 10, a sealing stopper 15, the socket (first socket) 20, the robot (gripping mechanism) 30, an image capturing unit (recognition unit) 40, a cap part (first cap part) 50, a cap tool (rotary mechanism) 60, and a control unit 70. The liquid supply device 100 of the present embodiment is to suitably fix the socket 20 to the plug 10 regardless of the orientation of the plug 10 even when the internal space of the liquid storage container 200 is pressurized and thus deformed and the orientation of the plug 10 fixed to a first opening 210 is changed.

As illustrated in FIG. 1, the liquid storage container 200 is a container formed in a cylindrical shape about an axis Z1 extending in the perpendicular direction and is provided with the first opening 210 and a second opening 220 in the top face (top plate). An internal thread is formed in each inner circumferential surface of the first opening 210 and the second opening 220.

Since the position or the orientation of the first opening 210 differs among liquid storage containers 200 for each individual, the position or the orientation of the plug 10 installed in the first opening 210 can also differ among the liquid storage containers 200 for each individual. Further, when there is a change in the internal pressure of the liquid storage container due to the state of a liquid contained in the liquid storage container 200, the environmental temperature, or the like, this will cause a change in the orientation of the first opening 210 to which the plug 10 is fixed, accordingly. The liquid supply device 100 of the present embodiment is to reliably couple the socket 20 to the plug 10 even when the orientation of the first opening 210 varies due to a difference in the shape of the liquid storage container 200 for each individual or a difference in the environmental temperature or the like.

The plug 10 is fixed to the first opening 210 and has a plug side liquid channel 11 extending along a plug axis (first plug axis) Zp1. The plug side liquid channel 11 extends to a part near the bottom 230 of the liquid storage container 200. An external thread is formed in the outer circumferential surface at the upper end of the plug 10. The external thread of the plug 10 is engaged with the internal thread of the first opening 210, and thereby the plug 10 is fixed to the first opening 210.

Figure 6:
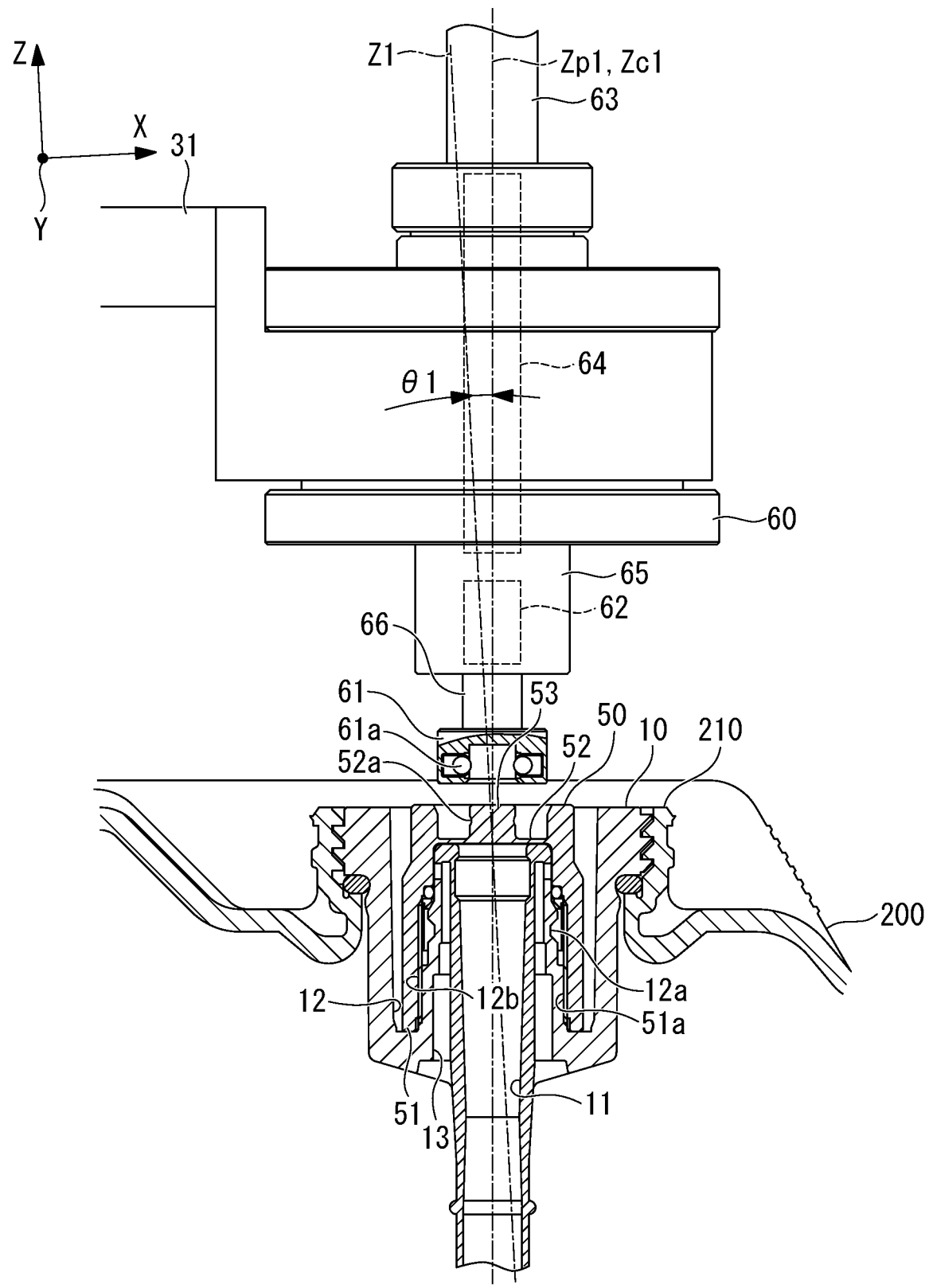
FIG. 6 is a partial sectional view illustrating a state where a cap tool has been moved close to the plug.

FIG. 6 is a partial sectional view illustrating a state where the cap tool 60 has been moved close to the plug 10. As illustrated in FIG. 6, a groove (first groove) 12 extending in an annular shape about the plug axis Zp1 is formed in the tip (upper end) of the plug 10. A groove 12 has a fixing groove (plug side fixing part) 12a used for fixing lock balls 22a of the socket 20. A fixing groove 12a is formed annularly about the plug axis Zp1. An external thread (second thread part) 12b configured to engage with the internal thread 51a of the cap part 50 is formed in the groove 12 of the plug 10.

The sealing stopper 15 is a member fixed to the second opening 220 and configured to seal the second opening 220. An external thread is formed in the outer circumferential surface of the sealing stopper 15. The external thread of the sealing stopper 15 has been engaged with the internal thread of the second opening 220, and thereby the sealing stopper 15 is fixed to the second opening 220.

The socket 20 is detachably attached to the plug 10 and has a socket side liquid channel 21 extending along a socket axis (first socket axis) Zs1. The socket 20 is connected to a liquid pipe LL1 used for supplying a liquid to supply target devices and a gas pipe GL1 used for supplying a gas to the liquid storage container 200. The socket 20 is gripped by a hand 31 of the robot 30.

Figure 9:
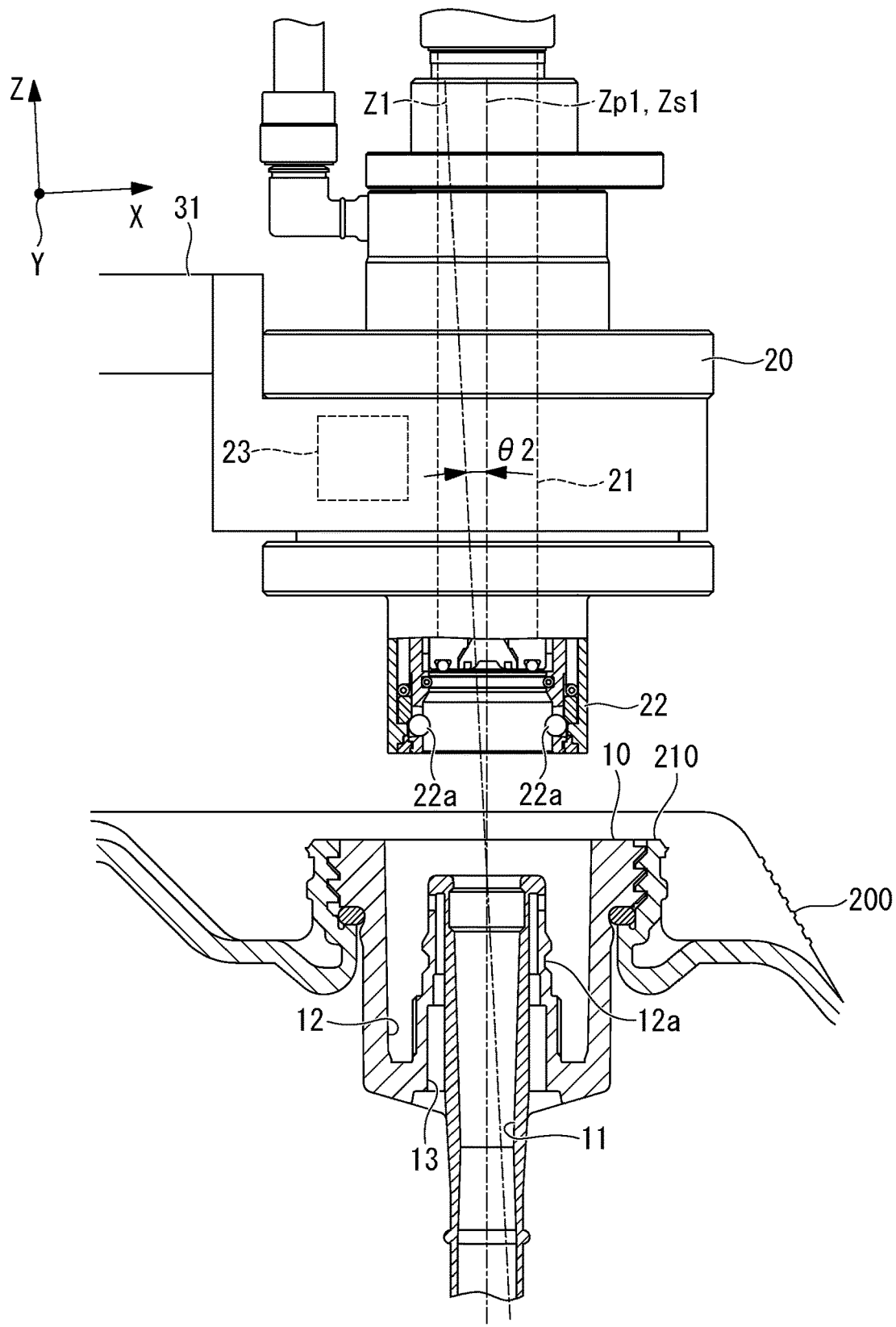
FIG. 9 is a partial sectional view illustrating a state where the socket has been moved close to the plug.

FIG. 9 is a partial sectional view illustrating a state where the socket 20 has been moved close to the plug 10. As illustrated in FIG. 9, a protrusion (first protrusion) 22 extending annularly about the socket axis Zs1 is formed to the tip (lower end) of the socket 20. The protrusion 22 has a plurality of lock balls (socket side fixing part) 22a fixed in the fixing groove 12a of the plug 10. The lock balls 22a are arranged at multiple positions spaced apart from each other around the socket axis Zs1.

The robot 30 is a mechanism that grips the socket 20 and the cap tool 60 and arranges the socket 20 and the cap tool 60 in a predetermined attitude at a three-dimensional position defined by an axis X, an axis Y, and an axis Z within a motion range. The robot 30 is a six-axis articulated robot, for example. The robot 30 has the hand 31, a wrist 32, a first arm 33, a second arm 34, a base part 35, and a turning body 36.

The turning body 36 is rotatably supported about an axis Zr1 perpendicular to the base part 35. The first arm 33 is rotatably supported with respect to the turning body 36 about a horizontal axis Zr2. The second arm 34 is rotatably supported with respect to the first arm 33 about a horizontal axis Zr3. The wrist 32 is attached to the second arm 34 at one end and attached to the hand 31 at the other end.

It is possible to arrange the wrist 32 at any three-dimensional position within the motion range of the wrist 32 by combining the rotational operation of the turning body 36 with respect to the base part 35, the rotational operation of the first arm 33 with respect to the turning body 36, and the rotational operation of the second arm 34 with respect to the first arm 33. Further, the wrist 32 is rotatable about three axes and can take any attitude by displacing the hand 31 about the three axes.

The image capturing unit 40 is a device that captures an image of the top face of the plug 10 and recognizes the position in the three-dimensional space of the plug 10 and the orientation of the plug axis Zp1 of the plug 10. The image capturing unit 40 transfers a recognition result of the position in the three-dimensional space of the plug 10 and the orientation of the plug axis Zp1 of the plug 10 to the control unit 70.

As illustrated in FIG. 6, the cap part (first cap part) 50 is a member that seals the plug side liquid channel 11. The cap part 50 has an insertion part 51 to be inserted in the groove 12 of the plug 10. The insertion part 51 is formed so as to extend cylindrically about a cap axis Zc1. An internal thread (first thread part) 51a is formed in the inner circumferential surface of the insertion part 51.

As illustrated in FIG. 6, the cap tool 60 is a rotary mechanism having a holding part 61 for holding the cap part 50 and configured to rotate the holding part 61 about the cap axis (first cap axis) Zc1. The cap tool 60 has a transmission part 64 that transmits, to the holding part 61, rotational power with which a rotary shaft 63 rotates about the cap axis Zc1. The cap tool 60 transmits the rotational power of the rotary shaft 63 to the holding part 61 and rotates the cap part 50 about the cap axis Zc1. The holding part 61 is connected to a cap tool body 65 via a shaft part 66. Pushing force directed in a direction away from the cap tool body 65 is applied to the shaft part 66 by a spring 62 built in the cap tool body 65.

The control unit 70 controls the robot 30 so that the socket 20 gripped by the hand 31 or the cap tool 60 is arranged in a desired attitude at a desired position based on a recognition result of the position in the three-dimensional space of the plug 10 and the orientation of the plug axis Zp1 of the plug 10 transmitted from the image capturing unit 40.

Figure 4:
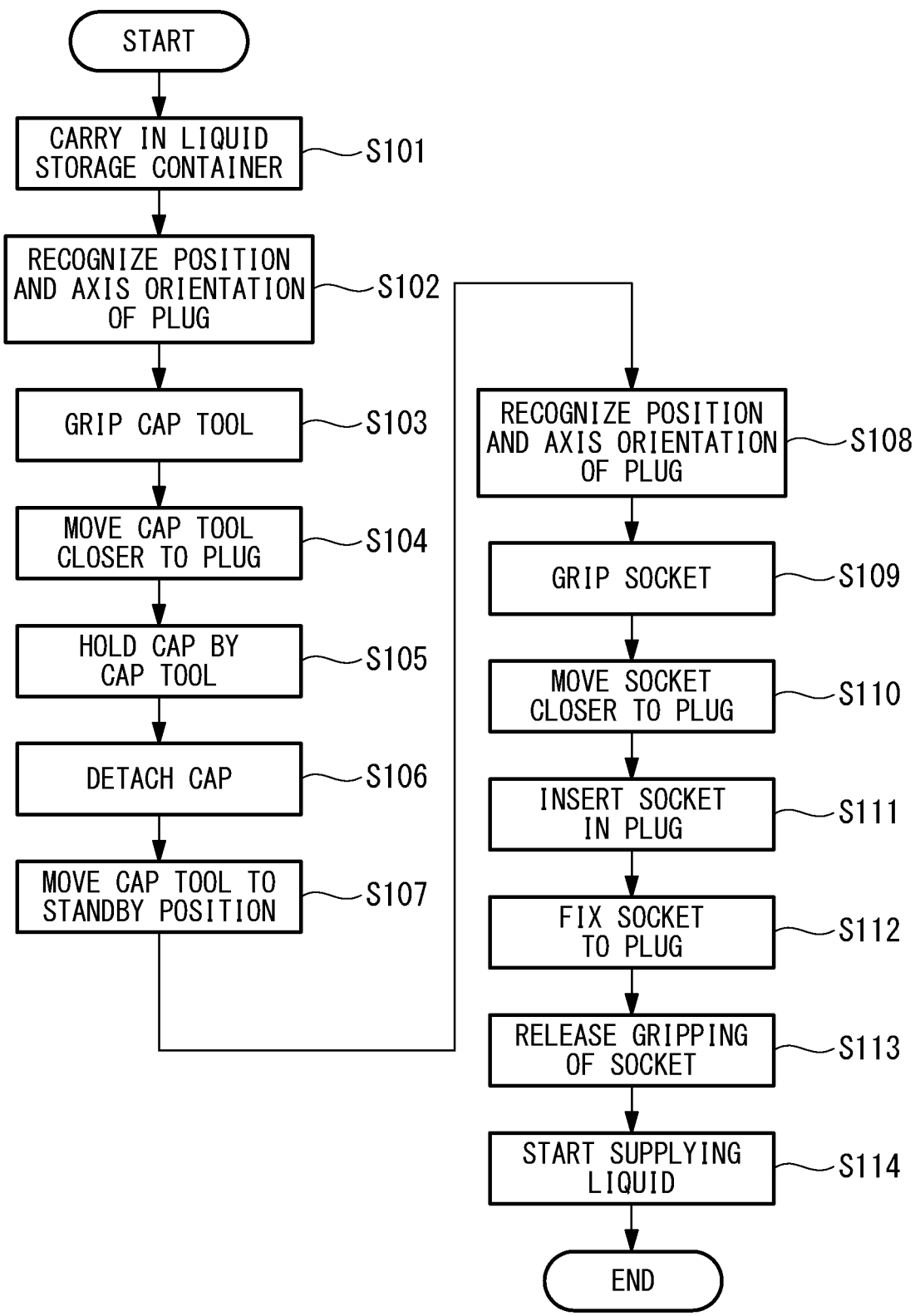
FIG. 4 is a flowchart illustrating a control method of a liquid supply device of the present embodiment and illustrates a process of attaching the socket to the plug.

Next, a control method of the liquid supply device 100 of the present embodiment will be described with reference to FIG. 4. FIG. 4 is a flowchart illustrating the control method of the liquid supply device 100 of the present embodiment and illustrates a process of attaching the socket 20 to the plug 10. Each process illustrated in FIG. 4 is performed when the control unit 70 performs the control program.

In step S101, the control unit 70 carries the liquid storage container 200 containing a liquid therein from a storage place (not illustrated) into a predefined position within the motion range of the robot 30. For example, the control unit 70 moves an unmanned carriage vehicle (not illustrated) carrying thereon the liquid storage container 200 and thereby carries the liquid storage container 200 into a predefined position. Note that a worker may use a carriage vehicle (not illustrated) to carry the liquid storage container 200 into the predefined position.

The cap part 50 has been attached to the first opening 210 of the liquid storage container 200 carried into in step S101. Further, the sealing stopper 15 has been attached to the second opening 220.

In step S102 (recognition step), the control unit 70 controls the image capturing unit 40 to recognize the position of the plug 10 and the orientation of the plug axis Zp1. Herein, an example of the process in which the image capturing unit 40 recognizes the position of the plug 10 and the orientation of the plug axis Zp1 will be described.

Figure 5:
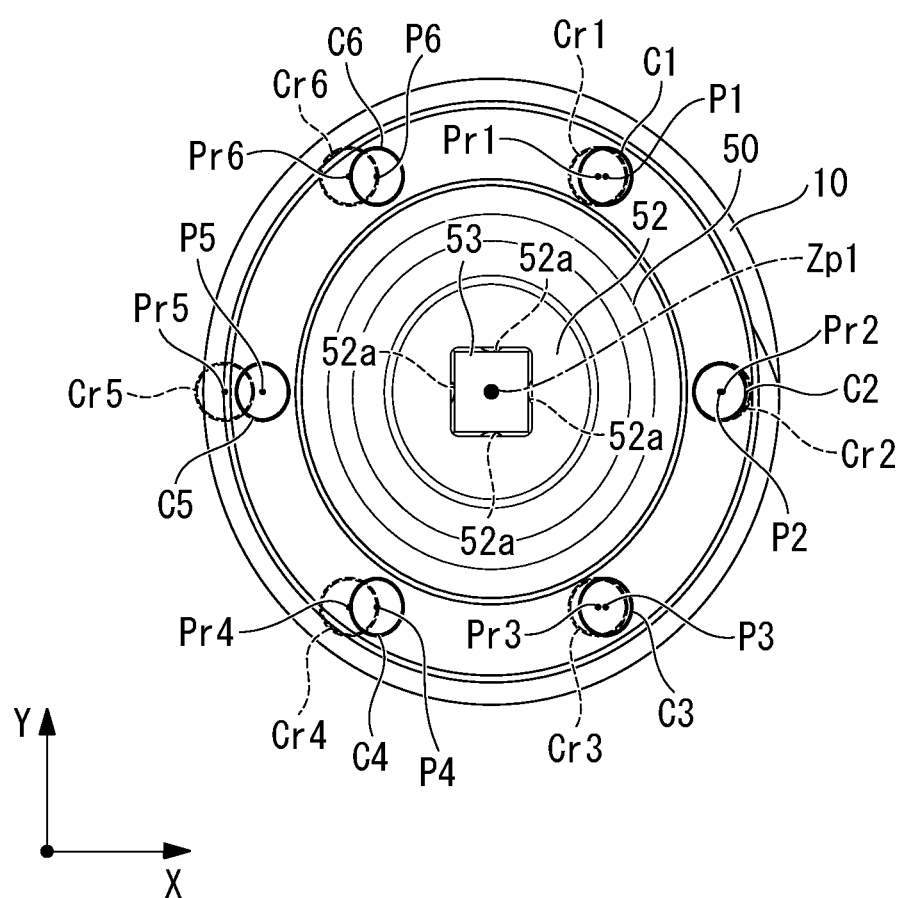
FIG. 5 is a diagram illustrating an image of the top face of the plug when captured from an image capturing unit.

FIG. 5 is a diagram illustrating an image of the top face of the plug 10 captured by the image capturing unit 40. As illustrated in FIG. 5, circular or substantially circular patterns C1, C2, C3, C4, C5, and C6 are formed on the top surface of the plug 10. Patterns Cr1, Cr2, Cr3, Cr4, Cr5, and Cr6 illustrated by dotted lines in FIG. 5 represent an image obtained when the image capturing unit 40 captures the top surface of the plug 10 when the plug axis Zp1 matches the axis Z1 extending in the perpendicular direction.

The center positions on the XY plane of the patterns Cr1, Cr2, Cr3, Cr4, Cr5, and Cr6 are Pr1, Pr2, Pr3, Pr4, Pry, and Pr6, respectively. From the image of the patterns Cr1, Cr2, Cr3, Cr4, Cr5, and Cr6, the image capturing unit 40 determines and stores the coordinates of Pr1, Pr2, Pr3, Pr4, Pr5, and Pr6 in a storage unit (not illustrated) in advance in association with coordinates Pr (PrX, PrY, PrZ) in the three-dimensional space of a predetermined portion of the plug 10.

The image capturing unit 40 determines P1, P2, P3, P4, P5, and P6 that are the center position coordinates on the XY plane of the patterns C1, C2, C3, C4, C5, and C6 from the image captured in step S102. The image capturing unit 40 then compares Pr1 with P1, Pr2 with P2, Pr3 with P3, Pr4 with P4, Pr5 with P5, and Pr6 with P6 to recognize coordinates P (PX, PY, PZ) corrected from the coordinates Pr in the three-dimensional space stored in the storage unit. The coordinates P represent the position in the three-dimensional space of a predetermined portion of the plug 10 captured by the image capturing unit 40. The image capturing unit 40 compares Pr1 with P1, Pr2 with P2, Pr3 with P3, Pr4 with P4, Pr5 with P5, and Pr6 with P6 to recognize the orientation of the plug axis Zp1.

In step S103, the control unit 70 controls the robot 30 to grip the cap tool 60 installed on an installation table TB1. The control unit 70 stores in advance the position of the cap tool 60 installed on the installation table TB1 and moves the hand 31 to a position near the cap tool 60 to grip the cap tool 60.

In step S104, the control unit 70 controls the robot 30 so that the cap tool 60 moves close to the plug 10 with the hand 31 gripping the cap tool 60. The control unit 70 controls the robot 30 so that the holding part 61 is arranged at a position distant by a certain distance along the plug axis Zp1 from the coordinates P of the plug 10 recognized in step S102.

The robot 30 grips the cap tool 60 so that the cap part 50 and the plug 10 are in an attitude where the orientation of the cap axis Zc1 matches the orientation of the plug axis Zp1 recognized by the image capturing unit 40 when arranging the cap tool 60 near the plug 10. The reason why the orientation of the cap axis Zc1 is matched to the orientation of the plug axis Zp1 is that the orientation of the plug axis Zp1 is not the same as the orientation of the axis Z1 extending in the perpendicular direction.

As illustrated in FIG. 6, the orientation of the plug axis Zp1 is inclined by an angle θ1 relative to the orientation of the axis Z1 extending in the perpendicular direction on the XZ plane. It is possible to move the holding part 61 of the cap tool 60 to the cap part 50 along the plug axis Zp1 by matching the orientation of the cap axis Zc1 to the orientation of the plug axis Zp1.

Note that the attitude where the orientation of the plug axis Zp1 and the orientation of cap axis Zc1 match is not necessarily required to be an attitude where the orientation of the plug axis Zp1 and the orientation of cap axis Zc1 are the same. For example, even when the orientation of the plug axis Zp1 and the orientation of the cap axis Zc1 by a sufficiently small angle differ from each other relative to the angle θ1 illustrated in FIG. 6, such a case can be considered as the attitude where the orientation of the plug axis Zp1 and the orientation of cap axis Zc1 match. The same applies to the following description.

In step S105, the control unit 70 controls the robot 30 gripping the cap tool 60 to hold the cap part 50 by the cap tool 60. The robot 30 moves the cap tool 60 to the cap part 50 along the plug axis Zp1. As illustrated in FIG. 6, the cap tool 60 has the holding part 61 configured to hold the cap part 50.

As illustrated in FIG. 6, the holding part 61 is provided with the lock balls 61*a* that generate pushing force toward the cap axis Zc1. Further, a housing groove 52 that can house the holding part 61 is formed in the top surface of the cap part 50. As illustrated in FIG. 5 and FIG. 6, a plurality of fixing grooves 52*a* to which the plurality of lock balls 61*a* are fixed are formed in the housing groove 52.

The cap tool 60 moves toward the cap part 50 so that the holding part 61 is housed in the housing groove 52 and the lock balls 61*a* are fixed to the fixing grooves 52*a*. When the cap tool 60 is further moved downward with the lock balls 61*a* being in contact with the center part 53 of the cap part 50, the spring 62 is contracted, and the pushing force of the spring 62 gradually increases.

When the pushing force of the spring 62 increases and the lock balls 61*a* move in a direction away from the plug axis Zp1, the lock balls 61*a* move to the positions of the fixing grooves 52*a* and are fixed to the fixing grooves 52*a*. This results in a state where the cap part 50 is held by the holding part 61 of the cap tool 60.

Figure 7:
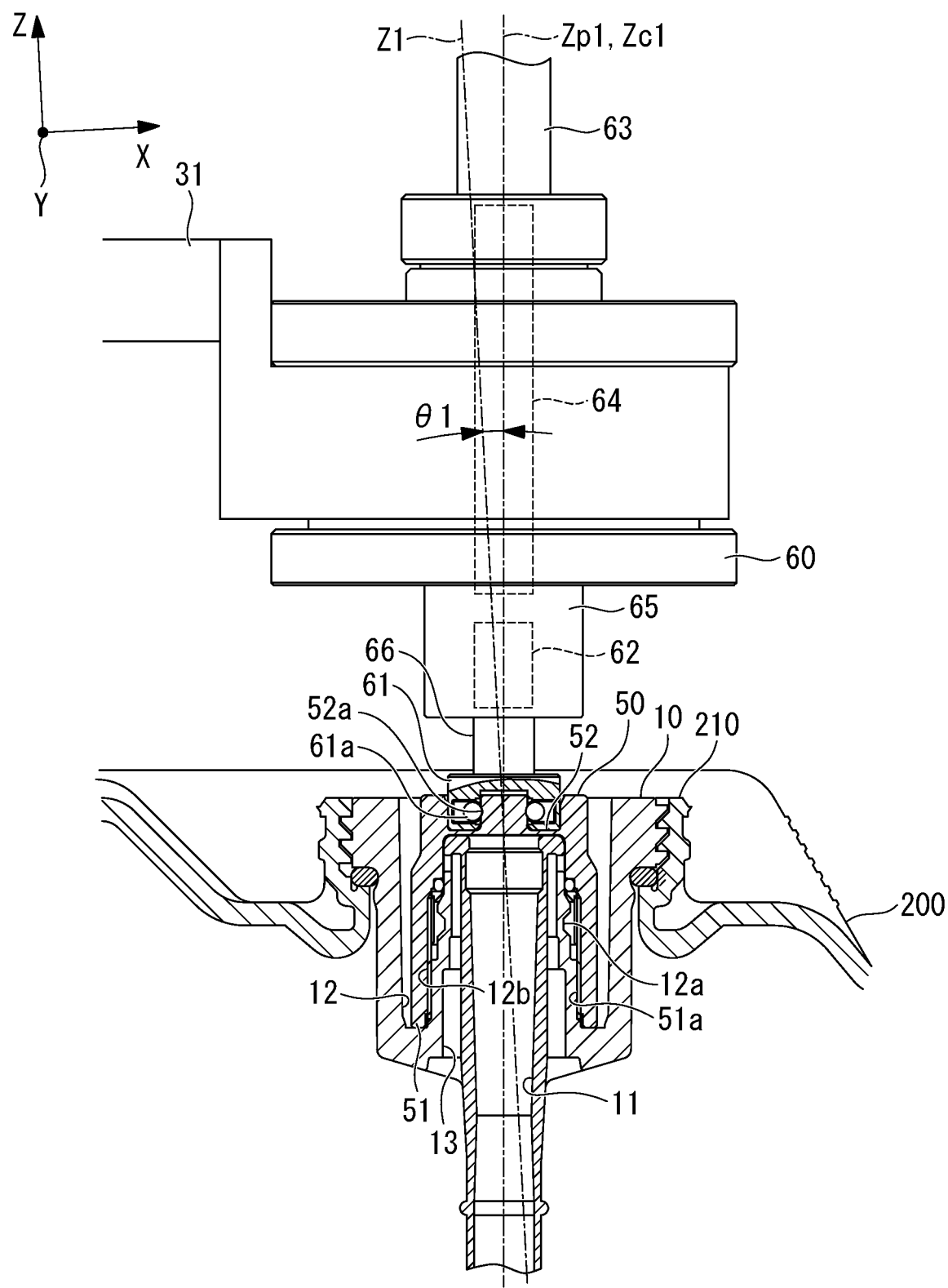
FIG. 7 is a partial sectional view illustrating a state where a cap is held by the cap tool.

The robot 30 then moves the cap tool 60 upward along the plug axis Zp1 so that the contracted spring 62 becomes the equilibrium length, and the state illustrated in FIG. 7 is thus obtained. As illustrated in FIG. 5, the center part 53 of the cap part 50 held by the holding part 61 has substantially a rectangular shape when viewed along the plug axis Zp1. Further, the holding part 61 has a recess whose shape viewed along the plug axis Zp1 is substantially rectangular so as to house the substantially rectangular portion of the cap part 50. The holding part 61 houses the center part 53 in the recess and thereby holds the cap part 50 without spinning the cap part 50.

Figure 8:
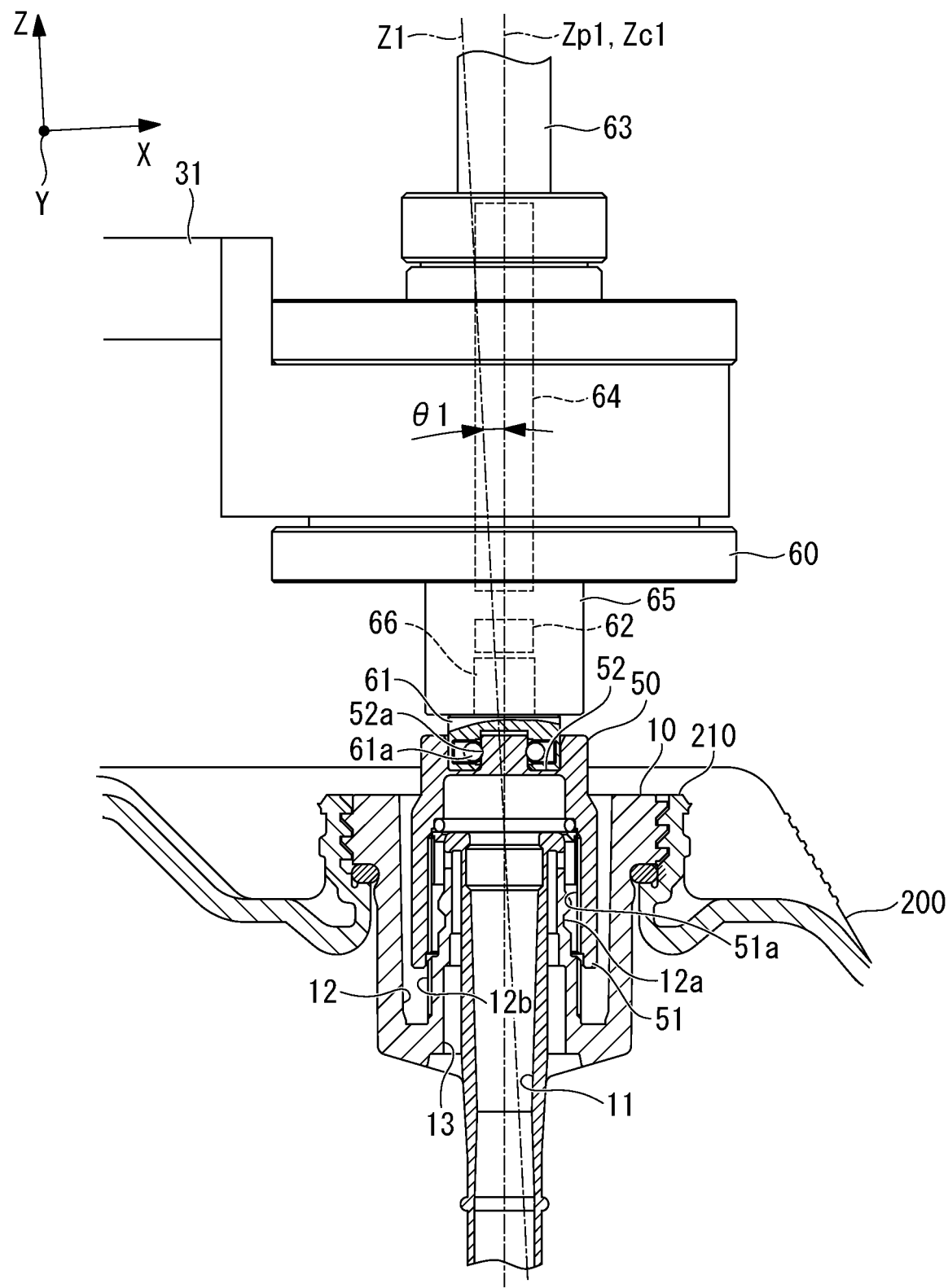
FIG. 8 is a partial sectional view illustrating a state where the cap has been detached from the plug by the cap tool.

In step S106, the control unit 70 rotates the holding part 61 in the anticlockwise direction (predetermined direction) with the cap part 50 being held by the holding part 61 to detach the cap part 50 from the plug 10. When the cap part 50 is rotated anticlockwise, the engagement between the external thread 12*b* of the plug 10 and the internal thread 51*a* of the cap part 50 is released, the state illustrated in FIG. 8 is thus obtained, and the cap part 50 is detached from the plug 10. When the engagement between the external thread 12*b* of the plug 10 and the internal thread 51*a* of the cap part 50 is released, the holding part 61 comes close to the cap tool body 65, the spring 62 is contracted, and the shaft part 66 is retracted in the cap tool body 65.

In step S106, the control unit 70 controls the robot 30 to move the cap tool 60 to a cap standby position (the position of reference 50 in FIG. 3) with the cap part 50 being held by the holding part 61. A fixing part (not illustrated) having an external thread that engages with the internal thread 51*a* of the cap part 50 is installed at the cap standby position.

The cap tool 60 transmits, to the holding part 61, rotational power with which the rotary shaft 63 rotates clockwise about the cap axis Zc1, engages the cap part 50 with the internal thread of the fixing part, and fixes the cap part 50 to the fixing part. The control unit 70 then controls the robot 30 to move the cap tool 60 not holding the cap part 50 to a cap tool standby position (the position of reference 60 in FIG. 3). In accordance with step S102 to step S107 described above, the cap part 50 is detached from the plug 10.

In step S108, the control unit 70 controls the image capturing unit 40 to recognize the position of the plug 10 and the orientation of the plug axis Zp1. The process in step S108 is the same as the process in step S102. The reason why the position of the plug 10 and the orientation of the plug axis Zp1 are recognized again in step S108 is that the position of the plug 10 and the orientation of the plug axis Zp1 may change when the cap part 50 is detached.

In step S109, the control unit 70 controls the robot 30 to grip the socket 20 installed on the installation table TB2. The control unit 70 stores in advance the position of the socket 20 installed on the installation table TB2 and moves the hand 31 to a position near the socket 20 to grip the socket 20.

In step S110 (gripping step), the control unit 70 controls the robot 30 so that the socket 20 moves close to the plug 10 with the hand 31 gripping the socket 20. The control unit 70 controls the robot 30 so that the protrusion 22 is arranged at a position distant by a certain distance along the plug axis Zp1 from the coordinates P of the plug 10 recognized in step S108.

The robot 30 grips the socket 20 so that the socket 20 and the plug 10 are in an attitude where the orientation of the socket axis Zs1 matches the orientation of the plug axis Zp1 recognized by the image capturing unit 40 when arranging the socket 20 near the plug 10. The reason why the orientation of the socket axis Zs1 is matched to the orientation of the plug axis Zp1 is that the orientation of the plug axis Zp1 is not the same as the orientation of the axis Z1 extending in the perpendicular direction.

As illustrated in FIG. 9, the orientation of the plug axis Zp1 is inclined by an angle θ2 relative to the orientation of the axis Z1 extending in the perpendicular direction on the XZ plane. It is possible to move the protrusion 22 of the socket 20 to the plug 10 along the plug axis Zp1 by matching the orientation of the socket axis Zs1 to the orientation of the plug axis Zp1.

Figure 10:
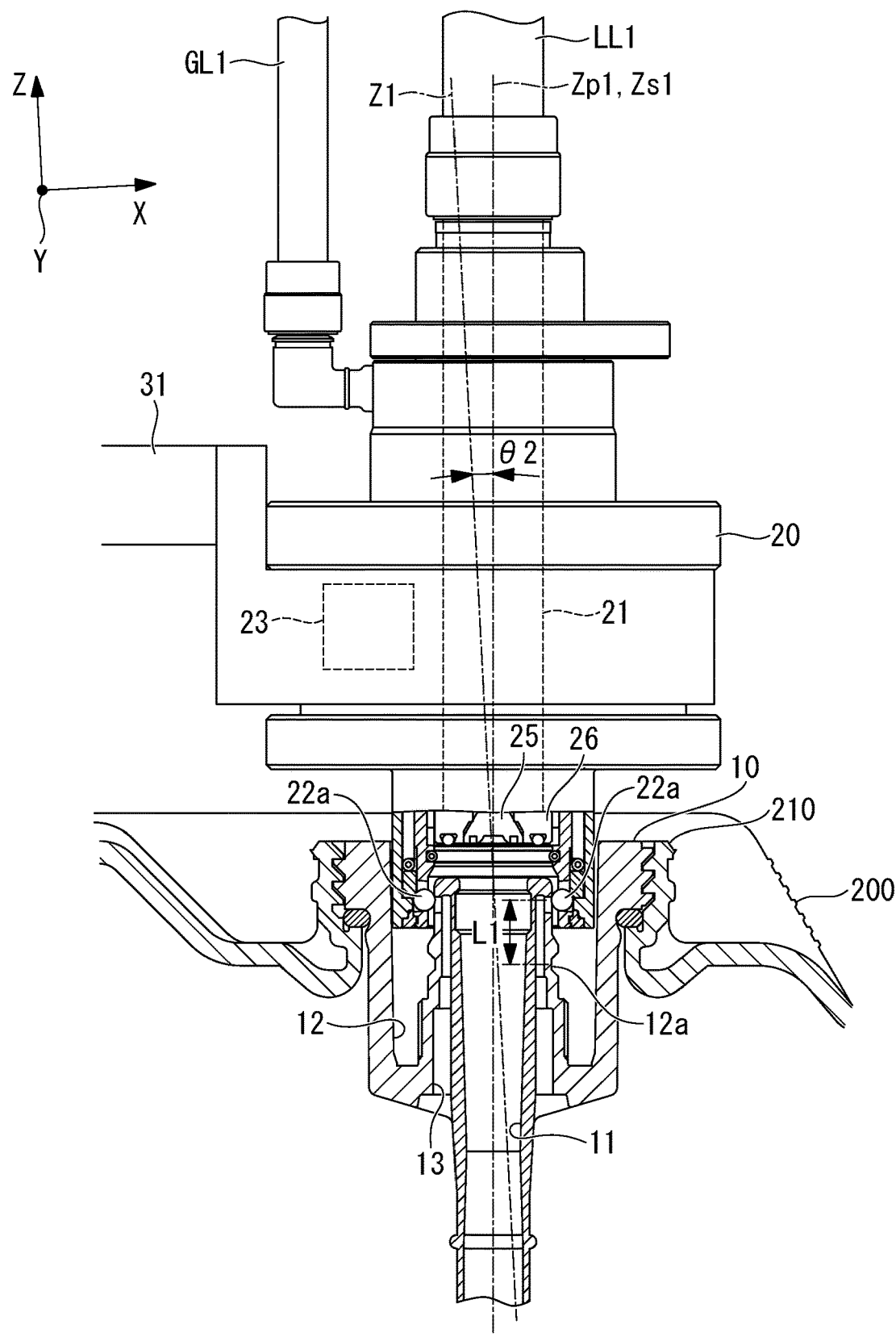
FIG. 10 is a partial sectional view illustrating a state where the socket has been inserted in the plug.

In step S111, the control unit 70 controls the robot 30 to insert the socket 20 in the plug 10. The robot 30 moves the hand 31 along the plug axis Zp1 so as to insert the protrusion 22 into the groove 12 of the plug 10. As illustrated in FIG. 10, the robot 30 inserts the protrusion 22 in the groove 12 so that the lock balls 22*a* are arranged at positions distant by a predetermined distance (first predetermined distance) L1 from the fixing groove 12*a* on the plug axis Zp1. When the protrusion 22 of the socket 20 has been inserted in the groove 12 of the plug 10, the state illustrated in FIG. 10 is obtained.

In step S112 (coupling step), the control unit 70 controls the socket 20 to fix the socket 20 to the plug 10. The socket 20 has an adjustment unit 23 that moves the protrusion 22 toward the bottom of the groove 12 of the plug 10. The adjustment unit 23 adjusts the position on the socket axis $Zs1$ of the lock balls 22$a$ with respect to the grip position gripped by the hand 31 of the robot 30 to obtain a state where the lock balls 22$a$ are arranged in the fixing groove 12$a$.

When the lock balls 22$a$ have been arranged in the fixing groove 12$a$, a state where the lock balls 22$a$ have been fixed to the fixing groove 12$a$ is obtained due to the pushing force of the spring 24. Thus, unless upward force overcoming the pushing force of the spring 24 is applied, the state where the socket 20 is fixed to the plug 10 is maintained.

As illustrated in FIG. 10, in a state where the lock balls 22$a$ are not arranged in the fixing groove 12$a$, a valve 25 is in contact with a body 26, and a state where the lower end of the socket side liquid channel 21 is sealed is obtained. In contrast, in a state where the lock balls 22$a$ are arranged in the fixing groove 12$a$, the body 26 comes into contact with the tip of the plug 10, and in response, the valve 25 is spaced apart from the body 26. Accordingly, the sealing of the socket side liquid channel 21 is released, and the socket side liquid channel 21 is coupled to the plug side liquid channel 11.

In step S113, the control unit 70 controls the robot 30 to release the state where the hand 31 grips the socket 20 and move the hand 31 to a predetermined standby position.

In step S114, the control unit 70 activates a pump (not illustrated) connected to the liquid pipe LL1 to start supplying the liquid contained in the liquid storage container 200 to the supply target device. The control unit 70 controls a gas source (not illustrated) connected to the gas pipe GL1 to supply the liquid storage container 200 with a gas (for example, air or nitrogen) corresponding to the volume of the liquid extracted from the liquid storage container 200.

The gas supplied from the gas pipe GL1 to the socket 20 flows through inside of the socket 20 and is supplied to a space above the liquid storage container 200 via the plug side gas channel 13. The liquid that has reached the upper end of the plug side liquid channel 11 is guided to the liquid pipe LL1 via the socket side liquid channel 21. The liquid guided to the liquid pipe LL1 is supplied to the supply target device. As set forth, liquid supply to the supply target device by the liquid supply device 100 is started.

Figure 12:
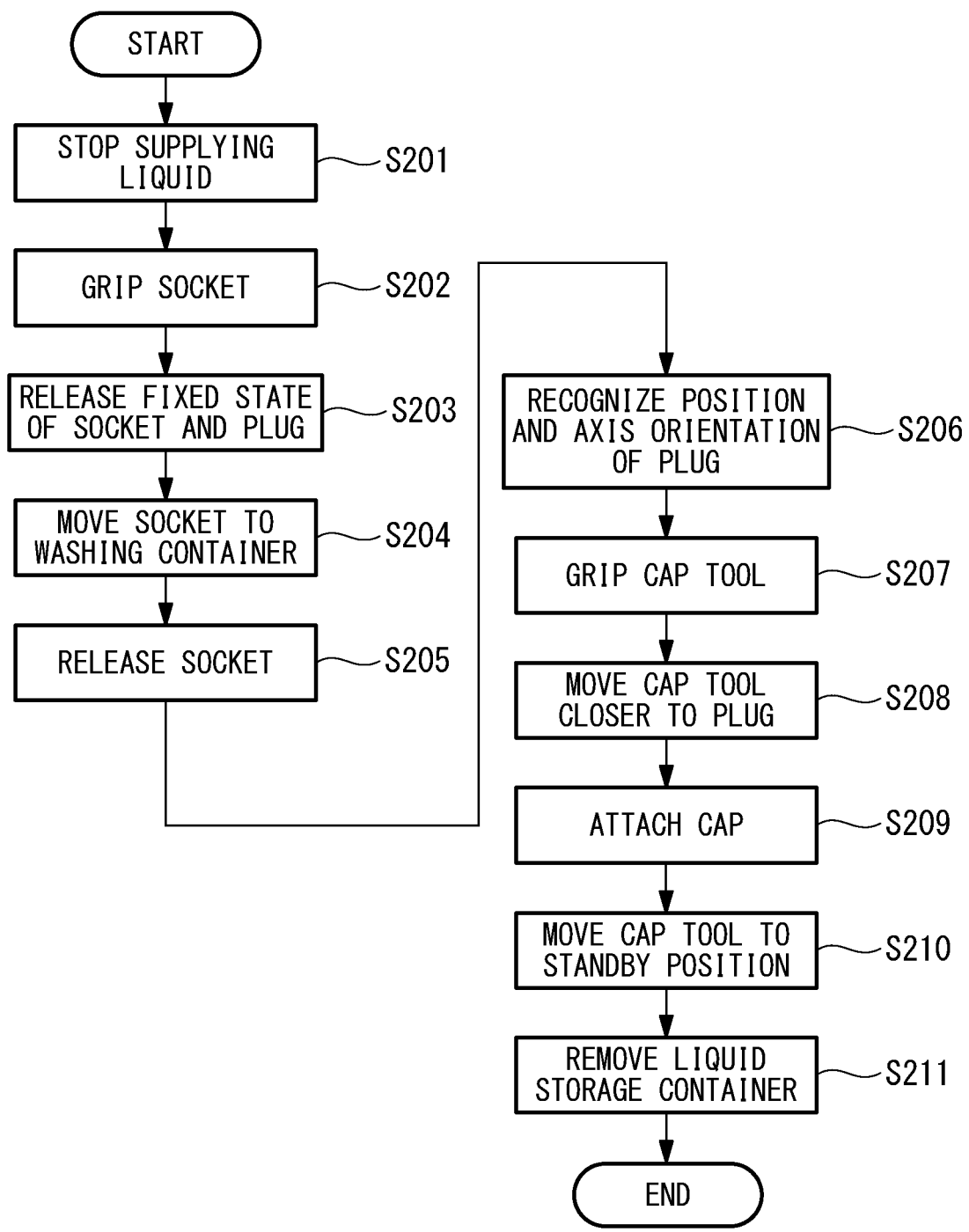
FIG. 12 is a flowchart illustrating a control method of the liquid supply device of the present embodiment and illustrates a process of detaching the socket from the plug.

While the supply of the liquid to the supply target device by the liquid supply device 100 is continued as long as the liquid in the liquid storage container 200 remains, the liquid storage container 200 is required to be replaced with a new liquid storage container 200 when the liquid in the liquid storage container 200 is depleted or reduced below a predetermined amount. Next, to replace the liquid storage container 200, a process of detaching the socket 20 from the plug 10 will be described with reference to FIG. 12.

In step S201, the control unit 70 performs control to stop the operation of the pump connected to the liquid pipe LL1 and stop supplying the gas to the socket 20 from the gas source connected to the gas pipe GL1. When the operation of the pump is stopped, the liquid supply from the liquid storage container 200 to the liquid pipe LL1 is stopped.

Figure 11:
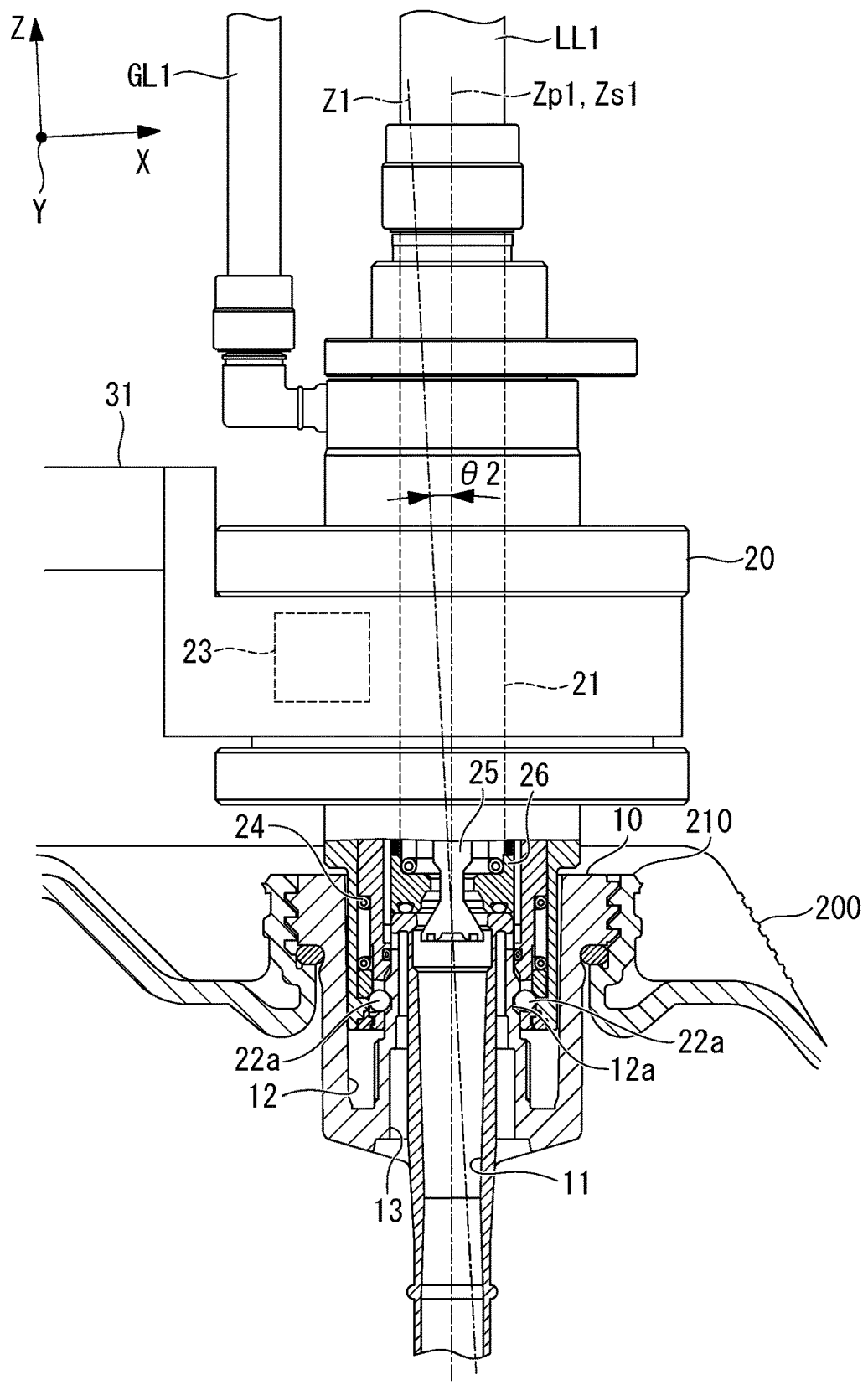
FIG. 11 is a partial sectional view illustrating a state where the socket has been fixed to the plug.

In step S202, the control unit 70 controls the robot 30 to move the hand 31 from a predetermined standby position to a position where the hand 31 can grip the socket 20 and to cause the hand 31 to grip the socket 20. When the hand 31 grips the socket 20, the state illustrated in FIG. 11 is obtained.

In step S203, the control unit 70 controls the socket 20 to release the fixed state where the socket 20 is fixed to the plug 10. The adjustment unit 23 adjusts the position on the socket axis $Zs1$ of the lock balls 22$a$ with respect to the grip position gripped by the hand 31 of the robot 30 to obtain a state where the lock balls 22$a$ are not arranged in the fixing groove 12$a$.

The adjustment unit 23 applies upward force overcoming the pushing force of the spring 24 to contract the spring 24. When the spring 24 is contracted, the state where the lock balls 22$a$ are fixed to the fixing groove 12$a$ is released, the lock balls 22$a$ move to positions away from the fixing groove 12$a$, and the state illustrated in FIG. 10 is obtained. The control unit 70 then controls the robot 30 to pull the socket 20 from the plug 10. The robot 30 moves the hand 31 along the plug axis $Zp1$ to pull the protrusion 22 from the groove 12 of the plug 10.

In step S204, the control unit 70 controls the robot 30 to move the hand 31 to a washing container WC installed on an installation table TB2 with the hand 31 gripping the socket 20. The washing container WC stores a washing liquid (for example, pure water) that washes the liquid attached to the socket 20.

When the liquid attached to the socket 20 is a chemical solution such as slurry that is solidified upon contact with atmospheric air, by immersing the socket 20 in a washing liquid, it is possible to prevent the chemical solution from being left attached to the socket 20 and then dried and solidified. Note that it is desirable to continuously supply the washing container WC with a new washing liquid and maintain the socket 20 uncontaminated.

In step S205, the control unit 70 controls the robot 30 to release the state where the hand 31 grips the socket 20 and thereby cause the hand 31 to release the socket 20. The control unit 70 then controls the robot 30 so that the hand 31 moves to a predetermined standby position. As set forth, the operation to detach the socket 20 from the plug 10 is completed.

In step S206, the control unit 70 controls the image capturing unit 40 to recognize the position of the plug 10 and the orientation of the plug axis $Zp1$. The process of step S206 is the same as the step of step S102.

In step S207, the control unit 70 controls the robot 30 to grip the cap tool 60 installed on the installation table TB1. The control unit 70 stores in advance the cap tool standby position of the cap tool 60 installed on the installation table TB1 (the position of reference 60 in FIG. 4) and controls the robot 30 to move the hand 31 to the cap tool standby position to grip the cap tool 60. The control unit 70 then controls the robot 30 to move the cap tool 60 to the cap standby position (the position of reference 50 in FIG. 3) to hold the cap part 50 by the holding part 61.

In step S208, the control unit 70 controls the robot 30 to move the cap tool 60 near the plug 10 with the hand 31 gripping the cap tool 60. The control unit 70 controls the robot 30 so that the holding part 61 is arranged at a position distant by a certain distance along the plug axis $Zp1$ with respect to the coordinates P of the plug 10 recognized in step S206, and the state illustrated in FIG. 13 is obtained.

The robot 30 grips the cap tool 60 so that the cap part 50 and the plug 10 are in an attitude where the orientation of the cap axis $Zc1$ matches the orientation of the plug axis $Zp1$ recognized by the image capturing unit 40 when arranging the cap tool 60 near the plug 10. The reason why the orientation of the cap axis Zc1 is matched to the orientation of the plug axis Zp1 is that the orientation of the plug axis Zp1 is not the same as the orientation of the axis Z1 extending in the perpendicular direction.

Figure 13:
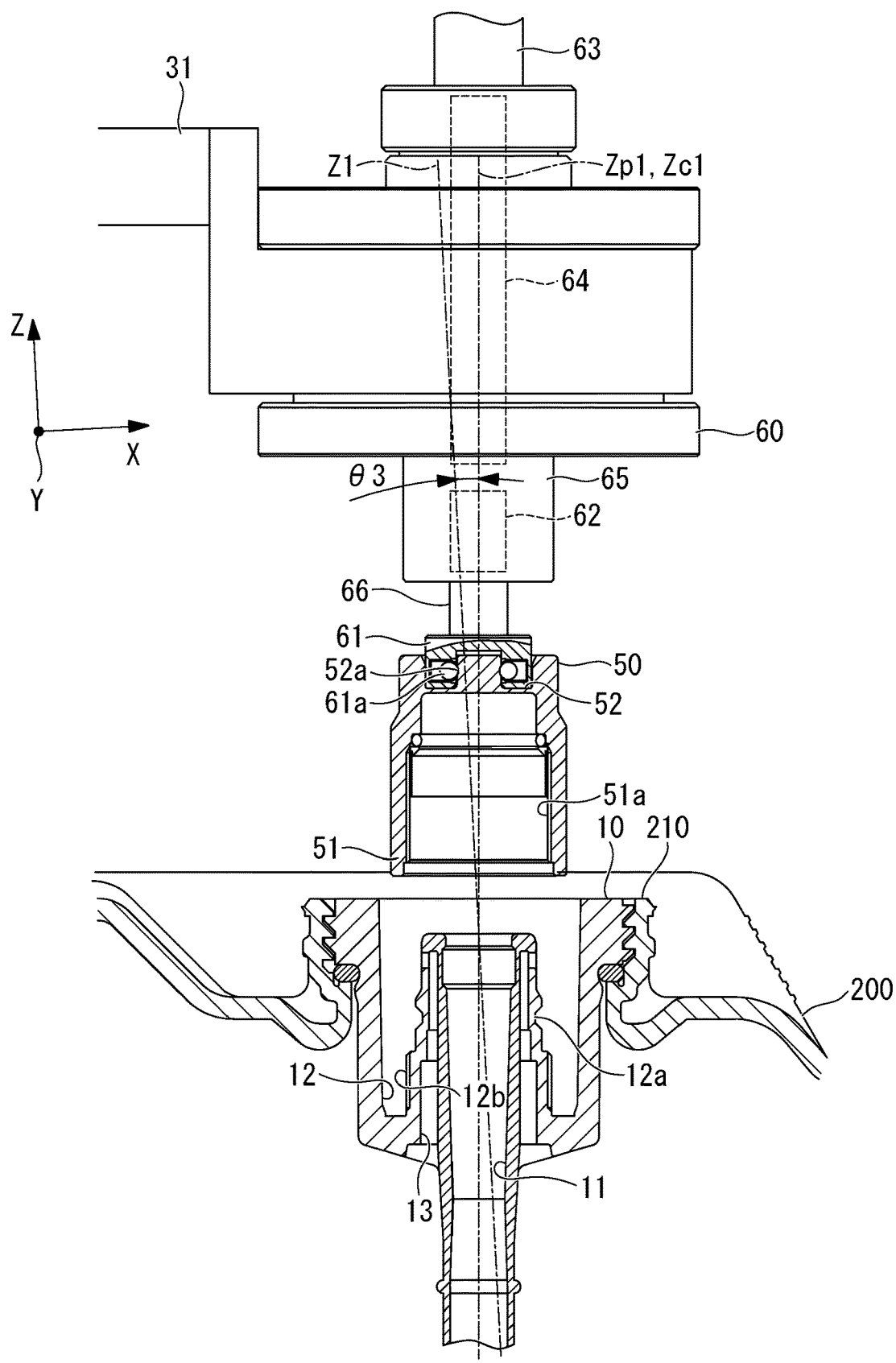
FIG. 13 is a partial sectional view illustrating a state before the cap is attached to the plug by the cap tool.

As illustrated in FIG. 13, the orientation of the plug axis Zp1 is inclined by an angle θ3 relative to the orientation of the axis Z1 extending in the perpendicular direction on the XZ plane. It is possible to move the cap part 50 held by the holding part 61 of the cap tool 60 toward the plug 10 along the plug axis Zp1 by matching the orientation of the cap axis Zc1 to the orientation of the plug axis Zp1. After the state illustrated in FIG. 13 is obtained, the control unit 70 controls the robot 30 to move the cap part 50 toward the plug 10 along the plug axis Zp1, and the state illustrated in FIG. 8 is obtained.

In step S209, the control unit 70 controls the robot 30 gripping the cap tool 60 to attach the cap part 50 to the plug 10. The robot 30 moves the cap tool 60 toward the cap part 50 along the plug axis Zp1, and the state illustrated in FIG. 8 is obtained. The control unit 70 rotates the holding part 61 by the transmission part 64 in the clockwise direction (the opposite direction to the predetermined direction) with the cap part 50 being held by the holding part 61. Accordingly, the external thread 12b of the plug 10 and the internal thread 51a of the cap part 50 are engaged with each other, and the cap part 50 is attached to the plug 10.

The cap tool 60 transmits rotational power in the clockwise direction of the rotary shaft 63 to the holding part 61 by the transmission part 64 to rotate the cap part 50 clockwise. In response to clockwise rotation of the cap part 50, the external thread 12b of the plug 10 and the internal thread 51a of the cap part 50 are engaged with each other to form the state illustrated in FIG. 7, and the cap part 50 is attached to the plug 10.

In step S210, the control unit 70 controls the cap tool 60 so that the holding part 61 moves upward along the cap axis Zc1, and the state illustrated in FIG. 6 where the cap part 50 is detached from the holding part 61 is obtained. The control unit 70 then controls the robot 30 to move the cap tool 60 to the cap tool standby position with the hand 31 gripping the cap tool 60.

In step S211, the control unit 70 removes the used liquid storage container 200 to a disposal place (not illustrated). For example, the control unit 70 moves an unmanned carriage vehicle (not illustrated) carrying the used liquid storage container 200 thereon and thereby removes the liquid storage container 200 to the disposal place. Note that the worker may use a carriage vehicle (not illustrated) to remove the liquid storage container 200.

The effects and advantages achieved by the liquid supply device 100 of the present embodiment described above will be described.

According to the liquid supply device 100 of the present embodiment, the image capturing unit 40 recognizes the orientation of the plug axis Zp1 of the plug 10, and the robot 30 grips the socket 20 so that the socket 20 and the plug 10 are in an attitude where the orientation of the socket axis Zs1 matches the orientation of the plug axis Zp1. The socket 20 gripped by the robot 30 is inserted in the plug 10, and thereby the socket side liquid channel 21 is coupled to the plug side liquid channel 11. Since the socket 20 is gripped by the hand 31 of the robot 30 in a suitable attitude with respect to the orientation of the plug 10, it is possible to reliably couple the socket side liquid channel 21 to the plug side liquid channel 11 regardless of the orientation of the plug 10 fixed to the first opening 210 of the liquid storage container 200.

Further, according to the liquid supply device 100 of the present embodiment, it is possible to obtain a state where the protrusion 22 of the socket 20 is inserted in the groove 12 of the plug 10 by the robot 30 to form a fixed state where the lock balls 22a are fixed to the fixing groove 12a by the adjustment unit 23 of the socket 20. Further, it is possible to adjust the position of the lock balls 22a by using the adjustment unit 23 to release the fixed state where the lock balls 22a are fixed to the fixing groove 12a.

Further, according to the liquid supply device 100 of the present embodiment, the image capturing unit 40 recognizes the orientation of the plug axis Zp1 of the plug 10, and the robot 30 grips the cap tool 60 so that the cap part 50 and the plug 10 are in an attitude where the orientation of the cap axis Zc1 matches the orientation of the plug axis Zp1. The holding part 61 of the cap tool 60 gripped by the hand 31 is rotated in the anticlockwise direction, and thereby the cap part 50 held by the holding part 61 is detached from the plug 10.

Since the cap tool 60 is gripped by the hand 31 in a suitable attitude with respect to the orientation of the plug 10, the cap part 50 can be reliably detached from the plug 10 regardless of the orientation of the plug 10 fixed to the first opening 210 of the liquid storage container 200. Further, it is possible to rotate the holding part 61 in the clockwise direction by using the cap tool 60 to attach the cap part 50 to the plug 10.

Second Embodiment

Next, a liquid supply device 100A of a second embodiment of the present disclosure will be described. The present embodiment is a modified example of the first embodiment and is substantially the same as the first embodiment, and the description thereof will be omitted below except when particular description is provided below.

The liquid supply device 100 of the first embodiment is to attach the socket 20 to the plug 10 fixed to the first opening 210 of the liquid storage container 200, supply a gas to the liquid storage container 200 via the socket 20, and thereby supply a liquid to a supply target device. In contrast, as illustrated in FIG. 14, the liquid supply device 100A of the present embodiment is to attach sockets 20 to plugs 10 fixed to both the first opening 210 and the second opening 220.

Figure 14:
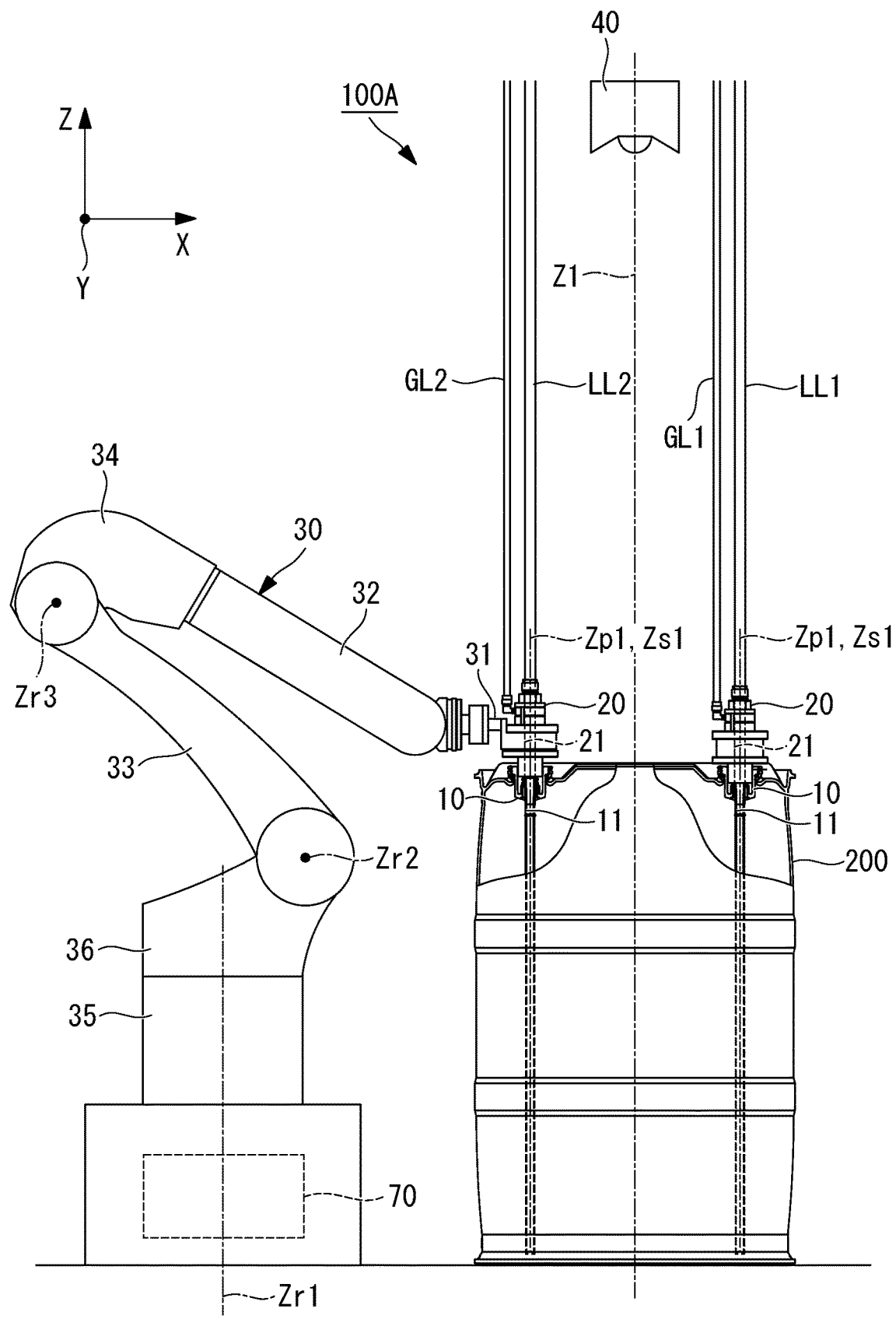
FIG. 14 is a side view illustrating a liquid supply device of a second embodiment of the present disclosure and illustrates a state where a robot has arranged a socket near a plug.

As illustrated in FIG. 14, the liquid supply device 100A of the present embodiment has the plugs 10 fixed to both the first opening 210 and the second opening 220 and the sockets 20 to which the plugs 10 are attached. The structure and the function of each plug 10 and each socket 20 are the same as those in the first embodiment.

The socket 20 attached to the plug 10 fixed to the first opening 210 is connected to a liquid pipe LL1 that supplies a liquid to a supply target device. The socket 20 attached to the plug 10 fixed to the second opening 220 is connected to a liquid pipe LL2 that returns a liquid circulating from the supply target device to the liquid storage container 200. In the present embodiment, the liquid supplied to the supply target device via the liquid pipe LL1 is returned to the liquid storage container 200 via the liquid pipe LL2 to circulate the liquid.

Cap parts 50 are attached in advance to both the plug 10 fixed to the first opening 210 and the plug 10 fixed to the second opening 220. In the present embodiment, first, the liquid storage container 200 on which the cap parts 50 are attached to both the first opening 210 and the second opening 220 is carried into a predefined position within a motion range of the robot 30.

The control unit 70 then performs steps S102 to S113 of FIG. 4 on the first opening 210. This operation results in a state where the socket 20 is attached to the plug 10 of the first opening 210. The control unit 70 then performs steps S102 to S113 of FIG. 4 on the second opening 220. This operation results in a state where the socket 20 is attached to the plug 10 of the second opening 220.

The control unit 70 activates a pump (not illustrated) connected to the liquid pipe LL1 after the sockets 20 have been attached to both the plug 10 of the first opening 210 and the plug 10 of the second opening 220. Once the operation of the pump is started, the liquid is supplied from the liquid storage container 200 to the supply target device via the liquid pipe LL1, and the liquid is returned from the supply target device to the liquid storage container 200 via the liquid pipe LL2. The gas used for replacing the volume of the liquid supplied from the liquid storage container 200 to the outside is supplied from both the gas pipe GL1 and the gas pipe GL2 to the liquid storage container 200. Note that only one of the gas pipe GL1 and the gas pipe GL2 illustrated in FIG. 14 may be connected to the socket 20 to supply the gas from the single gas pipe to the liquid storage container 200.

According to the liquid supply device 100A of the present embodiment, it is possible to reliably couple the socket side liquid channel 21 to the plug side liquid channel 11 regardless of the orientation of the plug 10 fixed to the first opening 210 of the liquid storage container 200. Further, it is possible to reliably couple the socket side liquid channel 21 to the plug side liquid channel 11 regardless of the orientation of the plug 10 fixed to the second opening 220 of the liquid storage container 200.

Third Embodiment

Next, a liquid supply device 100B of a third embodiment of the present disclosure will be described. The present embodiment is a modified example of the first embodiment and is substantially the same as the first embodiment, and the description thereof will be omitted below except when particular description is provided below.

Figure 15:
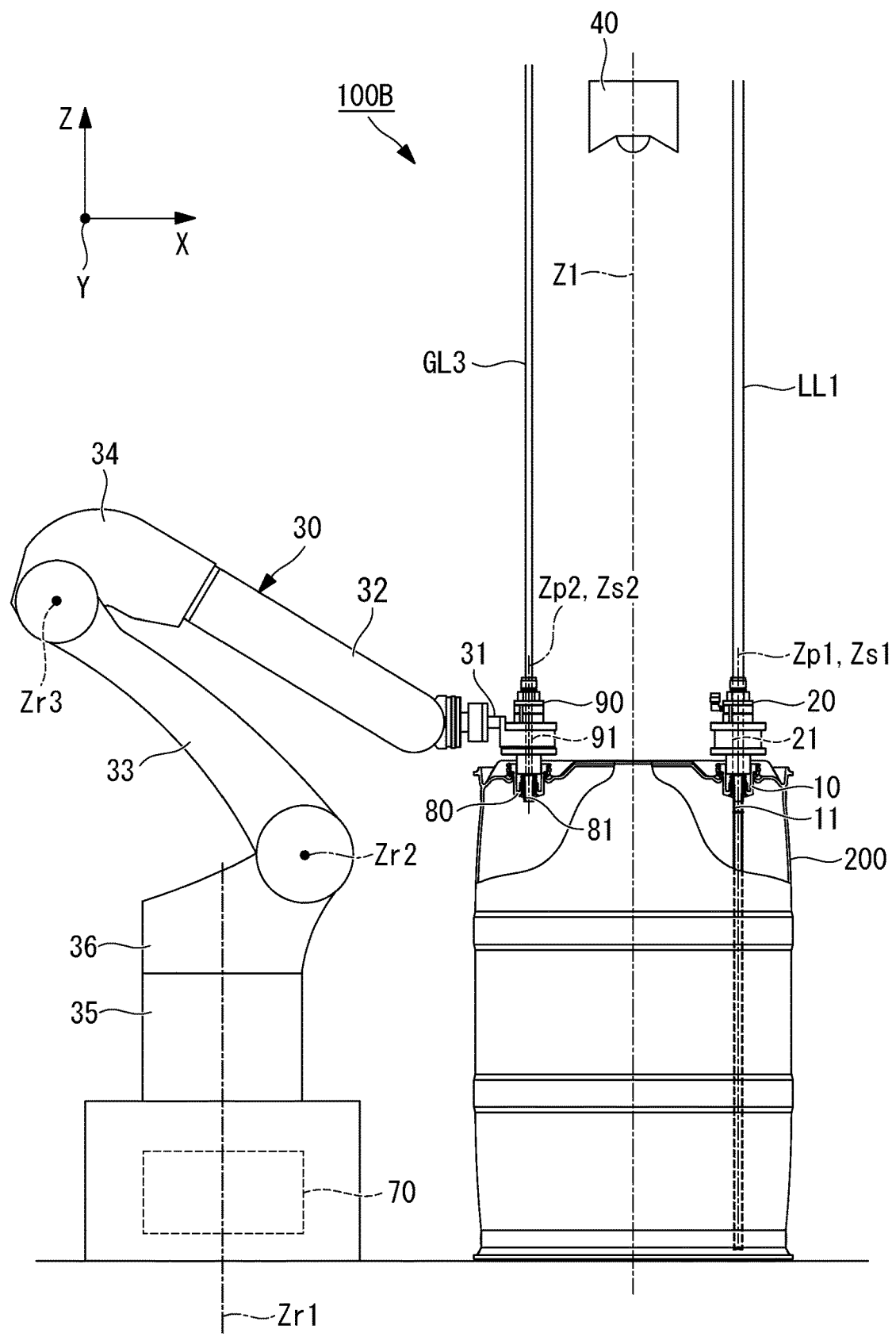
FIG. 15 is a side view illustrating a liquid supply device of a third embodiment of the present disclosure and illustrates a state where a robot has arranged a socket near a plug.

The liquid supply device 100 of the first embodiment is to attach the socket 20 to the plug 10 fixed to the first opening 210 of the liquid storage container 200, supply a gas to the liquid storage container 200 via the socket 20, and thereby supply a liquid to a supply target device. In contrast, as illustrated in FIG. 15, the liquid supply device 100B of the present embodiment is to fix a plug 80 to the second opening 220 to attach a socket 90.

The plug (second plug) 80 has a plug side gas channel 81 fixed to the second opening 220 and extending along a plug axis (second plug axis) Zp2. The plug side gas channel 81 communicates with a space above the liquid storage container 200. An external thread is formed in the outer circumferential surface of the upper end of the plug 80. The external thread of the plug 80 is engaged with the internal thread of the second opening 220, and thereby the plug 80 is fixed to the second opening 220.

The socket 90 is detachably attached to the plug 80 and has a socket side gas channel 91 extending along the socket axis (second socket axis) Zs2. The socket 90 is connected to a gas pipe GL3 used for supplying a gas to the liquid storage container 200. The socket 90 is gripped by the hand 31 of the robot 30.

The cap parts 50 are attached in advance to both the plug 10 fixed to the first opening 210 and the plug 80 fixed to the second opening 220. In the present embodiment, first, the liquid storage container 200 in which the cap parts 50 are attached to both the first opening 210 and the second opening 220 is carried into a predefined position within a motion range of the robot 30.

The control unit 70 then performs steps S102 to S113 of FIG. 4 on the first opening 210. This operation results in a state where the socket 20 is attached to the plug 10 of the first opening 210. The control unit 70 then performs steps S102 to S113 of FIG. 4 on the second opening 220. This operation results in a state where the socket 90 is inserted in the plug 80 of the second opening 220, and the socket side gas channel 91 is coupled to the plug side gas channel 81.

The control unit 70 activates a pump (not illustrated) connected to the liquid pipe LL1 after the socket 20 has been attached to the plug 10 of the first opening 210 and the socket 90 has been attached to the plug 80 of the second opening 220. Once the operation of the pump is started, the liquid is supplied from the liquid storage container 200 to the supply target device via the liquid pipe LL1. The gas used for replacing the volume of the liquid supplied from the liquid storage container 200 to the outside is supplied from the gas pipe GL3 to the liquid storage container 200 via socket 90.

According to the liquid supply device 100B of the present embodiment, it is possible to reliably couple the socket side liquid channel 21 to the plug side liquid channel 11 regardless of the orientation of the plug 10 fixed to the first opening 210 of the liquid storage container 200. Further, it is possible to reliably couple the socket side gas channel 91 to the plug side gas channel 81 regardless of the orientation of the plug 80 fixed to the second opening 220 of the liquid storage container 200.

In the present embodiment, the shape of the portion of the plug 10 in which the socket 20 is inserted differs from the shape of the portion of the plug 80 in which the socket 90 is inserted. Further, the shape of the portion of the socket 20 to be inserted in the plug 10 differs from the shape of the portion of socket 90 to be inserted in the plug 80. Thus, it is not possible to connect the socket 90 to the plug 10 even when the worker tries to do so, and it is not possible to connect the socket 20 to the plug 80 even when the worker tries to do so. This can prevent an erroneous connection of the socket 90 to the plug 10 and an erroneous connection of the socket 20 to the plug 80.

Although a gas is supplied from the gas pipe GL3 to the liquid storage container 200 via the socket 90 in order to replace the volume of a liquid supplied from the liquid storage container 200 to the outside in the present embodiment, another aspect may be employed. For example, to pressurize the space above the liquid storage container 200, a gas may be supplied from the gas pipe GL3 to the liquid storage container 200 via the socket 90. In such a case, the liquid stored in the liquid storage container 200 is supplied from the liquid storage container 200 to the supply target device via the liquid pipe LL1 by the pressure of the gas supplied from the gas pipe GL3.

What is claimed is:
1. A liquid supply device comprising:
a first plug fixed to a first opening in an upper face of a liquid storage container and having a plug side liquid channel extending along a first plug axis;
a first socket detachably attached to the first plug and having a socket side liquid channel extending along a first socket axis;

a gripping mechanism configured to grip the first socket and arrange the first socket in a predetermined attitude at a three-dimensional position within a motion range; and a recognition unit configured to recognize the orientation of the first plug axis of the first plug, wherein the gripping mechanism grips the first socket so that the first socket and the first plug are in an attitude where the orientation of the first socket axis matches the orientation of the first plug axis recognized by the recognition unit, and wherein when the first socket gripped by the gripping mechanism is inserted in the first plug, the socket side liquid channel is coupled to the plug side liquid channel.

2. The liquid supply device according to claim 1, wherein a first groove extending annularly about the first plug axis and having a plug side fixing part is formed in a tip of the first plug, wherein a first protrusion extending annularly about the first socket axis and having a socket side fixing part is formed in a tip of the first socket, wherein the gripping mechanism inserts the first protrusion in the first groove so that the socket side fixing part is arranged at a position distant by a first predetermined distance from the plug side fixing part on the first plug axis recognized by the recognition unit, and wherein the first socket has an adjustment unit configured to adjust the position on the first socket axis of the socket side fixing part with respect to a grip position gripped by the gripping mechanism to form a fixed state where the socket side fixing part is fixed to the plug side fixing part.

3. The liquid supply device according to claim 2, wherein the adjustment unit adjusts the position on the first socket axis of the socket side fixing part with respect to the grip position and releases the fixed state.

4. The liquid supply device according to claim 3, wherein the gripping mechanism grips the first socket detached from the first plug and moves the first socket to a washing container in which a washing liquid used for washing the first socket is stored.

5. The liquid supply device according to claim 2 further comprising:

a first cap part configured to seal the plug side liquid channel and having a first insertion part to be inserted in the first groove; and a rotary mechanism having a holding part for holding the first cap part and configured to rotate the holding part about a first cap axis, wherein a first thread is formed in the first insertion part of the first cap part, wherein a second thread adapted to engage with the first thread is formed in the first groove of the first plug, wherein the gripping mechanism grips the rotary mechanism so that the first cap and the first plug are in an attitude where the orientation of the first cap axis matches the orientation of the first plug axis recognized by the recognition unit, and wherein the rotary mechanism detaches the first cap part from the first plug by rotating the holding part in a predetermined direction with the first cap part being held by the holding part.

6. The liquid supply device according to claim 5, wherein the rotary mechanism attaches the first cap part to the first plug by rotating the holding part in the opposite direction to the predetermined direction with the first cap part being held by the holding part.

7. The liquid supply device according to claim 1 further comprising:

a second plug fixed to a second opening in the upper face of the liquid storage container and having a plug side gas channel extending along a second plug axis; and a second socket detachably attached to the second plug and having a socket side gas channel extending along a second socket axis, wherein the recognition unit recognizes the orientation of the second plug axis of the second plug, wherein the gripping mechanism grips the second socket so that the second socket and the second plug are in an attitude where the orientation of the second socket axis matches the orientation of the second plug axis recognized by the recognition unit, and wherein when the second socket gripped by the gripping mechanism is inserted in the second plug, the socket side gas channel is coupled to the plug side gas channel.

8. A liquid supply method for supplying a liquid by a liquid supply device, wherein the liquid supply device comprises a first plug fixed to a first opening in an upper face of a liquid storage container and having a plug side liquid channel extending along a first plug axis, a first socket detachably attached to the first plug and having a socket side liquid channel extending along a first socket axis, and a gripping mechanism configured to grip the first socket and arrange the first socket in a predetermined attitude at a three-dimensional position within a motion range, the liquid supply method comprising:

a recognition step of recognizing the orientation of the first plug axis of the first plug;

a gripping step of gripping the first socket by the gripping mechanism so that the first socket and the first plug are in an attitude where the orientation of the first socket axis matches the orientation of the first plug axis recognized by the recognition step; and a coupling step of coupling the socket side liquid channel to the plug side liquid channel by inserting the first socket gripped by the gripping step in the first plug.

* * * * *